(12) United States Patent
Perez-Cordova

(10) Patent No.: US 9,334,436 B2
(45) Date of Patent: May 10, 2016

(54) OIL RECOVERY METHOD AND PRODUCT

(71) Applicant: Racional Energy and Environment Company, Reno, NV (US)

(72) Inventor: Ramon Perez-Cordova, Conroe, TX (US)

(73) Assignee: Racional Energy and Environment Company, Reno, NV (US)

( * ) Notice: Subject to any disclaimer, the term of this patent is extended or adjusted under 35 U.S.C. 154(b) by 0 days.

(21) Appl. No.: 14/711,578

(22) Filed: May 13, 2015

(65) Prior Publication Data
US 2015/0315454 A1 Nov. 5, 2015

Related U.S. Application Data

(60) Continuation-in-part of application No. 14/167,401, filed on Jan. 29, 2014, which is a continuation of
(Continued)

(51) Int. Cl.
*C09K 8/34* (2006.01)
*C09K 8/36* (2006.01)
(Continued)

(52) U.S. Cl.
CPC . *C09K 8/265* (2013.01); *C09K 3/32* (2013.01); *C10G 1/002* (2013.01); *C10G 1/02* (2013.01);
(Continued)

(58) Field of Classification Search
CPC .... C10G 15/00; C10G 15/003; C10G 15/006; C10G 27/00; C10G 27/04; C10G 27/14; C10G 33/00; C10G 33/04; C10G 33/06; C10G 31/06; C10G 31/09; C10G 2300/1003; C10G 2300/1007; C10G 2300/301; C10G 2300/303; C10G 2400/00; C10G 2300/003; C10G 2300/10; C10G 2300/20; C10G 2300/201; C10G 2300/30; C10G 200/301; C10G 2300/302; C10G 2300/304; C10G 230/308; C10G 2300/70; C10G 2300/701; C10G 2300/706; C10G 2300/1033; C09K 8/02; C09K 8/03; C09K 8/035; C09K 8/32; C09K 8/34; C09K 8/36; C09K 2208/00; C09K 8/26; C09K 8/265; C09K 8/28; E21B 43/34; E21B 43/40; B01D 5/00; B01D 5/0057; B01D 5/0069; B01D 5/0072; B01D 5/0078; B01D 15/00; B01D 15/08; B01D 15/12; B01D 15/125; B01D 17/00; B01D 17/005; B01D 17/02; B01D 17/0202; B01D 17/04; B01D 17/0407; B01D 19/00; B01D 19/0073; B01D 36/00; B01D 36/01; B01D 36/003; B01D 36/008; B01D 37/00; B01J 3/0021; B01J 3/0026; B01J 3/003; B01J 3/0034; B01J 3/0086
USPC ................ 507/100, 103, 127, 129, 134, 200; 95/251, 253; 159/47.3; 203/28, 29, 31, 203/35, 38, 39, 41; 208/14, 179–182, 184, 208/186–188; 210/663, 669, 774, 806; 516/21, 22, 25, 28, 53, 58, 59, 72, 77
See application file for complete search history.

(56) References Cited

U.S. PATENT DOCUMENTS

| | | |
|---|---|---|
| 668,297 A | 2/1901 | Powter |
| 1,002,246 A | 9/1911 | Ellis |

(Continued)

OTHER PUBLICATIONS

ONV for UKOOA, Task 7.2: Techniques for the Offshore Treatment and Disposal of Retrieved Drill Cutting Piles. Environmental Resources Management, Jan. 17, 2000.
(Continued)

*Primary Examiner* — Joseph Drodge
(74) *Attorney, Agent, or Firm* — Daniel N. Lundeen; Lundeen & Lundeen PLLC

(57) ABSTRACT

A method to recover oil from an oil bearing substrate, and a reclaimed oil produced thereby having improved properties relative to the oil originally present in the substrate. Fluids comprising the recovered oil are also disclosed.

21 Claims, 17 Drawing Sheets

Related U.S. Application Data application No. 13/740,402, filed on Jan. 14, 2013, now Pat. No. 8,641,895, which is a division of application No. 13/180,379, filed on Jul. 11, 2011, now Pat. No. 8,356,678.

(60) Provisional application No. 61/408,494, filed on Oct. 29, 2010.

(51) Int. Cl.

| | |
|---|---|
| *C09K 8/26* | (2006.01) |
| *C09K 3/32* | (2006.01) |
| *C10G 1/00* | (2006.01) |
| *C10G 1/02* | (2006.01) |
| *C10G 1/04* | (2006.01) |
| *E21B 21/06* | (2006.01) |
| *C10G 25/00* | (2006.01) |
| *C10G 25/12* | (2006.01) |

(52) U.S. Cl.
CPC .............. *C10G 1/045* (2013.01); *C10G 25/003* (2013.01); *C10G 25/12* (2013.01); *E21B 21/063* (2013.01); C09K 8/34 (2013.01); C10G 2300/201 (2013.01); C10G 2300/302 (2013.01)

(56) References Cited

U.S. PATENT DOCUMENTS

| | | |
|---|---|---|
| 1,444,794 A | 2/1923 | Kerman |
| 1,809,672 A | 6/1931 | Butler et al. |
| 1,919,878 A | 7/1933 | Brownlee |
| 2,217,927 A * | 10/1940 | Van Campen ................. 507/134 |
| 2,585,701 A | 2/1952 | Lavere |
| 2,802,783 A * | 8/1957 | Weiss et al. .................... 507/108 |
| 2,962,114 A | 11/1960 | Medearis |
| 3,170,868 A | 2/1965 | Atkinson |
| 3,432,321 A | 3/1969 | Rostler |
| 3,819,508 A | 6/1974 | Fainman et al. |
| 4,014,780 A | 3/1977 | McCoy |
| 4,105,542 A | 8/1978 | Fainman |
| 4,188,284 A | 2/1980 | Quick |
| 4,264,453 A | 4/1981 | Mraovich |
| 4,385,666 A | 5/1983 | Mamadzhanov et al. |
| 4,460,551 A | 7/1984 | Boese et al. |
| 4,606,283 A | 8/1986 | DesOrmeaux et al. |
| 4,738,771 A | 4/1988 | Miller |
| 4,839,022 A | 6/1989 | Skinner |
| 4,841,998 A | 6/1989 | Bruya |
| 4,913,586 A | 4/1990 | Gabbita |
| 4,990,237 A | 2/1991 | Heuer et al. |
| 5,039,415 A | 8/1991 | Smith |
| 5,152,233 A | 10/1992 | Spisak |
| 5,199,354 A | 4/1993 | Wood |
| 5,228,804 A | 7/1993 | Balch |
| 5,234,577 A | 8/1993 | Van Slyke |
| 5,236,282 A | 8/1993 | Teasel et al. |
| 5,252,554 A | 10/1993 | Mueller et al. |
| 5,271,808 A | 12/1993 | Shurtleff |
| 5,272,833 A | 12/1993 | Prill et al. |
| 5,302,118 A | 4/1994 | Renegar et al. |
| 5,344,255 A | 9/1994 | Toor |
| 5,378,059 A | 1/1995 | Brock |
| 5,414,207 A | 5/1995 | Ritter |
| 5,430,237 A | 7/1995 | Sharp |
| 5,484,542 A | 1/1996 | Cahoon et al. |
| 5,573,656 A | 11/1996 | Santos |
| 5,630,785 A | 5/1997 | Pridemore et al. |
| 5,660,806 A | 8/1997 | Fristad et al. |
| 5,688,395 A | 11/1997 | Carrazza et al. |
| 5,736,031 A | 4/1998 | Nye et al. |
| 5,746,987 A | 5/1998 | Aulbaugh et al. |
| 5,788,781 A | 8/1998 | Van Slyke |
| 5,795,642 A | 8/1998 | Ishikawa et al. |
| RE36,066 E | 1/1999 | Mueller et al. |
| 5,885,441 A | 3/1999 | Pereira et al. |
| 5,927,970 A * | 7/1999 | Pate et al. ...................... 432/115 |
| 6,251,288 B1 | 6/2001 | Sicotte et al. |
| 6,328,118 B1 | 12/2001 | Karigan et al. |
| 6,407,302 B1 * | 6/2002 | Twu et al. ...................... 585/670 |
| 6,668,947 B2 | 12/2003 | Perez-Cordova |
| 6,978,851 B2 | 12/2005 | Perez-Cordova |
| 7,056,869 B2 | 6/2006 | Guyomar et al. |
| 7,311,814 B2 | 12/2007 | Guyomar et al. |
| 7,481,878 B1 | 1/2009 | Perez-Cordova |
| 7,690,445 B2 | 4/2010 | Perez-Cordova |
| 8,356,678 B2 * | 1/2013 | Perez-Cordova ............... 175/66 |
| 8,641,895 B2 * | 2/2014 | Perez-Cordova ............. 210/173 |
| 2003/0155158 A1 | 8/2003 | Szymocha et al. |
| 2003/0228196 A1 | 12/2003 | Satchwell et al. |
| 2005/0145418 A1 * | 7/2005 | Cordova ......................... 175/66 |
| 2005/0153844 A1 | 7/2005 | McIntyre |
| 2007/0017676 A1 | 1/2007 | Reddy |
| 2007/0095536 A1 | 5/2007 | Vinegar et al. |
| 2008/0121564 A1 * | 5/2008 | Smith .................. B01D 17/047 208/13 |
| 2008/0261836 A1 * | 10/2008 | Filler et al. ..................... 507/260 |
| 2008/0277164 A1 * | 11/2008 | Kapila et al. ..................... 175/66 |
| 2008/0296202 A1 | 12/2008 | Sneddon et al. |
| 2010/0150658 A1 | 6/2010 | Bilhete et al. |

OTHER PUBLICATIONS

Seaton, et al.; Analysis of Drilling Fluid Base Oil Recovered from Drilling Waste by Thermal Desorption; 13th International Petroleum Environmental Conference; Oct. 16-19, 2006.

* cited by examiner

SHAFT MOTION                SOLIDS FLOW PATTERN

OIL RECOVERY METHOD AND PRODUCT

CROSS REFERENCE TO RELATED APPLICATIONS

This application is a continuation-in-part of copending U.S. Ser. No. 14/167,401, filed Jan. 29, 2014, which is a continuation of U.S. Ser. No. 13/740,402, now U.S. Pat. No. 8,641,895 filed Jan. 14, 2013, which is a division of U.S. Ser. No. 13/180,379, filed Jul. 11, 2011, now U.S. Pat. No. 8,356,678, which claims priority benefit to U.S. Provisional Application No. 61/408,494, filed Oct. 29, 2010, all of which are hereby incorporated by reference herein.

FIELD OF THE INVENTION

This disclosure relates to a method and apparatus to recover oil from solid substrates, the reclaimed oil produced thereby, and the upgrading of the oil in a heterogeneous chemical-thermal desorption system, and compositions comprising the reclaimed oil.

The composition of many oil-based drilling muds typically includes the following compounds: (1) bentonite; (2) barite; (3) kerosene, diesel or other oil; (4) polymers; (5) sodium, calcium and potassium chlorides; (6) lime; and (7) water (invert emulsion). The inverse emulsion generally uses more oil than water. As used herein, the term "oil-based mud" also includes synthetic muds that are sometimes classified separately even though they contain appreciable amounts of hydrocarbons.

Conventional oil based drilling fluids may use oil containing as much as 30% aromatics or more, such as, kerosene, diesel or refined Group I or Group II base stocks, whereas synthetic drilling fluids may employ a hydrocarbon base stock with a higher viscosity (KV40 and/or KV100), a higher viscosity index (VI), a lower pour point, a lower specific gravity, a higher flash point and a lower content of functional groups such as hydroxide, aryls, substituted aryls, halogens, alkoxys, carboxylates, esters, acrylates, oxygen, nitrogen, carboxyl, and the like. On the other hand, Group III or Group IV (polyalphaolfins or PAO) base stocks can have a viscosity index of 120 or more, a kinematic viscosity of 3 to 3000 cSt at 100° C., a pour point of −20° C. or less, specific gravity less than 0.86 and a flash point of 200° C. or more.

In general, higher quality oils have lower concentrations of the low molecular weight aromatics benzene, toluene, ethyl benzene, and ortho, meta and para xylenes, commonly referred to as BETX, and sulfur. Higher quality oils also possess higher saturates, a higher viscosity, and have a higher viscosity index than diesel or other lower quality oils. BETX content is important in drilling applications since oil with a high BETX aromatic content as reflected by a low aniline point can cause elastomers used in O-rings and gaskets to swell and fail. The use of higher quality oils in drilling fluids may also allow the drilling fluid to perform under more severe conditions, to last longer, to reduce wear on the drilling equipment, to use less energy, etc.

The physical nature of the oil based drill cuttings (OBDC) complicates the recovery of and reclaiming of oil therefrom. Numerous attempts have been made to recover or remove a high quality oil from the drill cuttings with limited success. For example, the industry has had a long-felt need to address one or more of the following problems in the prior art OBDC treatment processes: the quantity of oil recovered may be very low and/or the residual oil remaining in the solids too high; the process or processing equipment may require excessive amounts of energy, require a long treatment times, large equipment costs, and requiring equipment which is not easily transported to a processing site, entail excessive risk of explosion or other hazards; and/or produce treated drill cuttings having a pH less than 6 or more than 8, i.e., the drill cuttings may be too acidic or especially too alkaline for environmental disposal. In addition, the quality of the oil obtained by recovery processes known in the art may not be suitable for re-use in drilling muds, especially in situations which require synthetic grade muds having one or more of a higher flash point, viscosity, viscosity index, and/or a lower pour point, specific gravity, lower BETX content and/or functional group content, relative to the oils typically present in and/or recovered from an OBDC treatment process.

There exists a need for efficient ways to obtain high quality oil from solids such as OBDC while removing sufficient oil from the solids for environmental disposal, which produce oils suitable for use applications including drilling fluids.

SUMMARY

The present disclosure is directed to a method and apparatus for processing a substrate comprising oil bound to or on a sorbent material, and in a particular embodiment, to the efficient recovery and production of a high quality oil from oil contaminated substrates such as oil based drill cuttings (OBDC) obtained from drilling of oil and gas wells.

In an embodiment, a method comprises (a) peptizing an acid-reactive substrate at a temperature between about 70° C. and about 105° C. with an acidic reagent under shear to obtain a peptizate having increased surface area, wherein the substrate comprises liquid bound on a solid sorbent material, wherein the liquid comprises oil or a mixture of oil and water, wherein the bound liquid comprises less than about 35 wt % of the substrate; (b) cocurrently mixing the peptizate with a combustion effluent gas under turbulent conditions in a thermal desorption zone to heat the peptizate and desorb at least a portion of the oil from the sorbent material, wherein an average residence time for solids in the desorption zone is from 10 seconds to 5 minutes and wherein a dilute phase in the thermal desorption zone at exit therefrom has a temperature of at least about 200° C.; (c) separating the peptizate—combustion effluent gas mixture into the dilute phase and a dense phase, wherein the dilute phase comprises oil vapor and whereby the dense phase has an oil content less than or equal to about 3 wt %; (d) contacting the dilute phase with a first heat exchanger at a temperature above 100° C. to produce a first recovered fraction comprising at least 50 wt % of the oil in the substrate; (e) recovering at least a portion of the oil present in first recovered fraction; and (f) purifying at least a portion of the recovered oil by a purification process comprising contacting at least a portion of the recovered oil with a treatment solution, with an absorbent, with one or more reagents, separating, filtering, or a combination thereof, to produce a reclaimed oil having a total BTEX concentration of less than 1 wt %, determined according to ASTM D-5790 or an equivalent thereof.

In an embodiment, a fluid comprises a reclaimed oil recovered by thermal desorption from a peptized substrate comprising less than about 35 wt % of an oil or a mixture of oil and water bound on a solid sorbent material, the reclaimed oil having a total BTEX concentration of less than 1 wt %, determined according to ASTM D-5790 or an equivalent thereof.

DETAILED DESCRIPTION

Figure 1A:
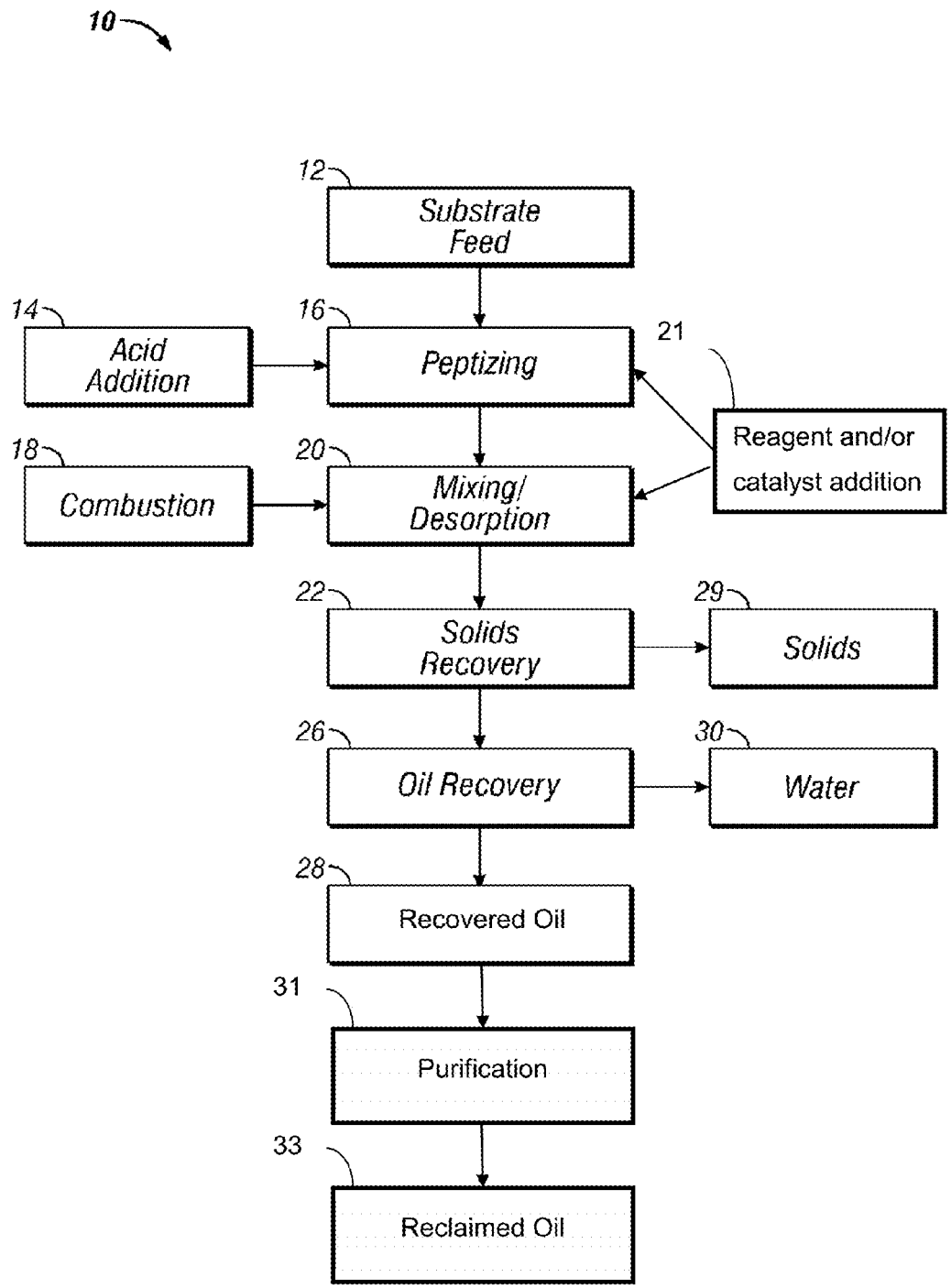
FIG. 1A shows a block diagram of an embodiment of the method disclosed herein.

The present disclosure is directed to a method and apparatus for processing a substrate containing oil to reclaim, and to recovery and reclaiming the oil therein, and further to purification or upgrading the recovered oil relative to the oil present in or on the substrate. In particular, the treatment of oil based drill cuttings (OBDC) from the drilling of oil and gas wells. The instant disclosure is also directed to the treatment of oil based drill cuttings for environmental disposal. Although the skilled person will appreciate the method and apparatus can be used to treat other substrates, especially oil-containing substrates having a peptizable matrix component such as acid-reactive clays or minerals wherein the oil is bound to a solid sorbent material, the following description refers to OBDC as a nonlimiting example for illustrative purposes.

The process provides fast and efficient processing of OBDC which can be achieved with relatively small peptizing, combustion, desorption, solids recovery, vapor recovery and/or oil recovery process units and short residence times, wherein the total processing time for the solids is on the order of minutes. In an embodiment, the processing equipment can be transportable, e.g., skid-mounted or trailer-mounted, for transportation to the drilling site or other on-site processing location. The process provides in one embodiment a relatively high oil recovery, e.g., 50, 60, 70, 75 or even 80 percent or more of the oil in the OBDC or other substrate. Furthermore, in a specific embodiment, the reclaimed oil may surprisingly have improved properties relative to the oil in the OBDC, e.g., a higher viscosity and/or lower BETX concentration that of the oil present in the substrate.

In an embodiment, the oil in the bound liquid in the substrate comprises more than 1 wt % or more than 2 wt % BETX by weight of the oil in the OBDC, and may contain as much as 20 wt %, 25 wt %, 30 wt % or more higher molecular weight aromatic hydrocarbons such as naphthalenic hydrocarbons, by weight of the oil in the OBDC, whereas the reclaimed oil comprises less BETX, preferably less than 2 wt % or more preferably less than 1 wt % BETX by weight of the reclaimed oil. As used herein, aromatics content is determined as the total BTEX (benzene-toluene-ethylbenzene-xylene) according to ASTM D-5790 (Purge and Trap-GC/MS), US EPA Method SW846, including SW846-8260B, GC/MS; Method 8021 GC/PID, Method 5035, or an equivalent thereof. In an embodiment, the viscosity of the reclaimed oil may be increased relative to the viscosity of the oil present in the substrate. In an embodiment, the reclaimed oil has a viscosity at 40° C. (KV40) of greater than 2 cSt, wherein the viscosity is determined according to ASTM-D88.

In an embodiment, a method comprises (a) peptizing an acid-reactive substrate at a temperature between about 70° C. and about 105° C. with an acidic reagent under shear to obtain a peptizate having increased surface area, wherein the substrate comprises liquid bound on a solid sorbent material, wherein the liquid comprises oil or a mixture of oil and water, wherein the bound liquid comprises less than about 35 wt % of the substrate; (b) cocurrently mixing the peptizate with a combustion effluent gas under turbulent conditions in a thermal desorption zone to heat the peptizate and desorb at least a portion of the oil from the sorbent material, wherein an average residence time for solids in the desorption zone is from 10 seconds to 5 minutes and wherein a dilute phase in the thermal desorption zone at exit therefrom has a temperature of at least about 200° C.; (c) separating the peptizate-combustion effluent gas mixture into the dilute phase and a dense phase, wherein the dilute phase comprises oil vapor and whereby the dense phase has an oil content less than or equal to about 3 wt %; (d) contacting the dilute phase with a first heat exchanger at a temperature above 100° C. to produce a first recovered fraction comprising at least 50 wt % of the oil in the substrate; (e) recovering at least a portion of the oil present in first recovered fraction; and (f) purifying at least a portion of the recovered oil by a purification process comprising contacting at least a portion of the recovered oil with a treatment solution, with an absorbent, with one or more reagents, separating, filtering, or a combination thereof, to produce a reclaimed oil having a total BTEX concentration of less than 1 wt %, determined according to ASTM D-5790 or an equivalent thereof.

In an embodiment, the purification process of the method may comprise contacting the recovered oil with at least one treatment solution comprising an acid, a base, a salt, or a combination thereof, followed by separating the oil from the treatment solution. In an embodiment, the purification process comprises contacting the recovered oil with at least one treatment solution comprising, consisting of, or consisting essentially of a mineral acid, which may comprise, consisting of, or consisting essentially of sulfuric acid, followed by separating the oil from the treatment solution.

In an embodiment, the purification process comprises contacting the recovered oil with an absorbent selected from the group consisting of activated carbon, zeolites, alumina, silica, an aluminosilicate, a phyllosilicate, a titanate, wood powder, a bleaching earth clay, an anion exchange resin, a cation exchange resin, or a combination thereof, under conditions sufficient to remove at least a portion of an impurity from the recovered oil. In an embodiment, the purification process may further comprise separating the absorbent from the recovered oil, regenerating the absorbent to remove the impurities absorbed thereby, and recycling the regenerated absorbent back into the purification process.

In an embodiment, the purification process comprises contacting the recovered oil with an amount of activated carbon at a temperature, and for a period of time sufficient to reduce the color of the recovered oil by at least 0.5 Saybolt color units, determined according to ASTM D156 or an equivalent thereof.

In an embodiment, the purification process comprises contacting the recovered oil with a reagent or catalyst selected from the group consisting of hydrogen, ozone, a peroxide, an amine, a group 3-12 transition metal, a group 3-12 transition metal compound, a group 3-12 transition metal salt, or a combination thereof.

In an embodiment, a fluid comprises a reclaimed oil recovered by thermal desorption from a peptized substrate comprising less than about 35 wt % of an oil or a mixture of oil and water bound on a solid sorbent material according to the process of the instant disclosure, the reclaimed oil having a total BTEX concentration of less than 1 wt %, determined according to ASTM D-5790 or an equivalent thereof.

In an embodiment, the reclaimed oil comprises greater than or equal to about 45% long chain methylene $CH_2$ protons having a $^1H$ NMR chemical shift greater than or equal to about 1.00 to 1.50 ppm relative to trimethylsilane in $CDCl_3$, based on the total number of protons present, and less than or equal to about 12% $CH_2/CH$ protons beta to an aromatic carbon having a $^1H$ NMR chemical shift from greater than 1.50 to about 2.00 ppm relative to trimethylsilane in $CDCl_3$, based on the total number of protons present.

In an embodiment, the reclaimed oil further comprises greater than or equal to about 3.5 wt % aromatic protons having a $^1H$ NMR chemical shift of greater than or equal to about 6.50 to about 8.50 ppm relative to trimethylsilane in $CDCl_3$, based on the total number of protons present.

In an embodiment, the reclaimed oil further comprises greater than or equal to about 1 wt % poly-nuclear aromatic protons having a $^1H$ NMR chemical shift of greater than or equal to about 7.50 to about 9.00 ppm relative to trimethylsilane in $CDCl_3$, based on the total number of protons present, and/or the reclaimed oil comprises less than or equal to about 0.4 wt % aromatic protons having a $^1H$ NMR chemical shift of greater than or equal to about 4.50 to about 6.00 ppm relative to trimethylsilane in $CDCl_3$, based on the total number of protons present.

In an embodiment, the reclaimed oil further comprises less than or equal to about 0.5 wt % ether protons having a $^1H$ NMR chemical shift of greater than or equal to about 3.50 to about 4.00 ppm relative to trimethylsilane in $CDCl_3$, based on the total number of protons present.

In an embodiment, the reclaimed oil further comprises less than or equal to about 0.9 wt % protons alpha to an aromatic carbon having a $^1H$ NMR chemical shift of greater than or equal to about 2.00 to about 3.50 ppm relative to trimethylsilane in $CDCl_3$, based on the total number of protons present.

In an embodiment, the reclaimed oil has an aniline point of greater than or equal to about 69° C. when determined according to ASTM D611 or an equivalent thereof. In an embodiment, the reclaimed oil has an initial boiling point of greater than or equal to about 170° C. and an end boiling point of greater than about 400° C., wherein the initial boiling point and the end boiling point are determined according to ASTM D86 or an equivalent thereof.

In an embodiment, the reclaimed oil has a kinematic viscosity at 20° C. of less than or equal to about 5 cSt and/or a kinematic viscosity at 40° C. of less than or equal to about 3 cSt, wherein the kinematic viscosity is determined according to ASTM D445 or an equivalent thereof.

In an embodiment, the reclaimed oil comprises greater than or equal to about 5 ppm by weight of organically bound nitrogen, determined according to ASTM D4629 or an equivalent thereof.

In an embodiment, the reclaimed oil comprises greater than or equal to about 100 ppm of total sulfur by weight, determined according to ASTM D5453 or an equivalent thereof.

In an embodiment, the fluid comprises a water-in-oil emulsion comprising a surfactant system, an aqueous phase, and about 50 wt % to about 95 wt % of the reclaimed oil, wherein the water-in-oil emulsion has an electrical stability of greater than 1000V when determined according to API 13B-2, or an equivalent thereof.

In an embodiment, the water-in-oil emulsion has an electrical stability determined according to API 13B-2, or an equivalent thereof, which is at least 100V greater than an identically determined electrical stability of an essentially identical water-in-oil emulsion in which the reclaimed oil is replaced with diesel fuel.

In an embodiment, the reclaimed oil is suitable for use in a drilling fluid. For example, the reclaimed oil in one embodiment is further processed by formulating a drilling fluid based on the oil, in one embodiment the reclaimed oil is utilized in place of a synthetic oil base stock. The drilling fluid can also be formulated with a brine component, e.g., as an internal phase, that is also recovered from the OBDC or a high-liquid (greater than 35 wt % liquids or where the liquid can be readily recovered by filtration, pressing, centrifugation or the like) water based or oil based drill cuttings or water based or oil based spent drilling fluids.

For purposes herein, to further clarify the instant disclosure, a recovered oil refers to an oil prior to any subsequent or final purification steps prior to producing the final product of the process, which is referred to herein as a reclaimed oil. However, it is to be understood that a recovered oil according to one embodiment may be referred to as a reclaimed oil in another embodiment, the distinction depending on the intended final use of the oil produced according to the instant disclosure. As such, the term may be used interchangeably herein.

The exact mechanism for the improvement of the qualities and properties of the reclaimed oil are not known, but it is theorized that the oil may undergo various reactions in the low-oxygen or reducing atmosphere in the chemical-thermal treatment such as cracking, reforming, oligomerization, hydrogenation, dehydrogenation, coking, isomerization or the like, and further that the drill cuttings or other sorbent material, particularly by pretreatment or "activation" by the acid treatment in the peptizing step, may act as a catalyst for the conversion of the hydrocarbons to paraffinic and/or alicyclic hydrocarbons and/or conversion of heterohydrocarbon components to non-functionalized hydrocarbons. It is also theorized that the mechanism(s) may selectively favor reaction of the aromatic compounds and devolatilization of the paraffinic compounds. The disclosure is, however, not bound by any particular theory or reaction mechanism.

FIG. 1A shows a method 10 according to an embodiment of the present disclosure to separate and recover oil from a substrate feed 12 which may be OBDC and/or other oil-containing materials. The method 10 may include acid addition 14 and peptizing 16, wherein the substrate is contacted with an amount of an acidic reagent for a period of time, at a temperature, and under shear to react at least a portion of the substrate to produce a peptizate having an increased surface area compared to the substrate. The acidic reagent can include a mineral acid added in step 14 to the substrate at one or more stages before or during the peptizing step 16.

Combustion 18 provides a hot effluent gas at a temperature greater than 300° C. and comprising less than 1 vol % oxygen for mixing and desorption 20 to mix the peptizate with the hot gas under turbulent conditions to heat the substrate and desorb at least a portion of the oil. Solids recovery 22 may involve separating the mixture from the substrate mixing/desorption step 20 to obtain a dilute phase comprising vapor including devolatilized oil from the substrate and a dense phase comprising oil-lean solids 29. Solids recovery 22 may also include removal of entrained solids from the dilute phase with cyclonic separation, filtration, electrostatic precipitation, scrubbing or the like, or any combination thereof.

In oil recovery step 26, recovered oil 28 is recovered from the dilute phase vapors by, for example, condensation and gravity separation of the condensate into respective streams of recovered oil 28 and an aqueous phase 30. In an embodiment, at least a portion of the recovered oil stream 28 is collected for further purification according to a purification process 31 to produce the product reclaimed oil 33. In an embodiment, the process may include, or may further include the addition of a reagent and/or catalyst into the peptizer and/or desorber 21 prior to the oil recovery 26 and subsequent purification process 31.

Figure 1B:
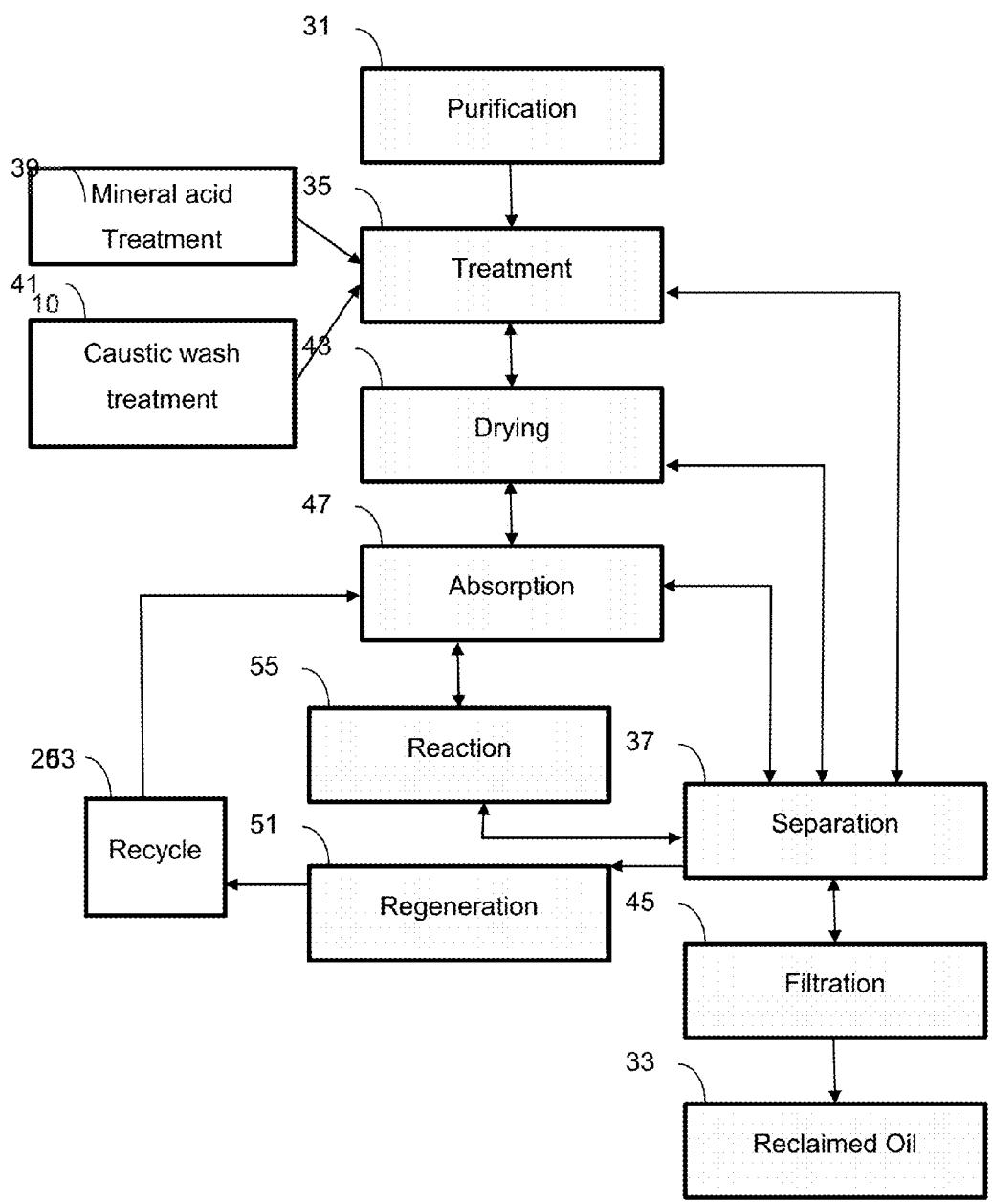
FIG. 1B shows a block diagram of an embodiment of a purification process according to the method disclosed herein.

The purification process 31 may comprise one or more purification process steps (See FIG. 1B). In an embodiment, at least a portion of the recovered oil 28 may be used in the process 10, e.g., as a fuel in combustion step 18.

As shown in FIG. 1B, in an embodiment, the purification process 31 may include one or more additional processes to further purify the recovered oil for a particular end use. Examples include acid treatment, distillation, filtering, treatment with activated carbon, absorbents, adsorbents, and/or the like, reaction with various materials to remove and/or convert impurities contained therein, fractionation, ion exchange, and/or the like, depending on the desired properties of the oil and/or dependent on the intended use of the subsequently purified recovered oil.

In an embodiment, the purification process 31 may include one or more washing or treatment steps 35 comprising contacting the recovered oil with at least one treatment solution followed by one or more separation steps 37 wherein the treated oil (i.e., further purified oil) is physically separated from the treatment solution. In an embodiment, one or more of the treatment solutions comprises an aqueous solution comprising a salt, e.g., a brine. In an embodiment, one or more of the treatment solutions is acidic or comprises an acid 39 (i.e., having a pH less than 3). In an embodiment, one or more of the acidic treatment solutions comprise, consists of, or consists essentially of a mineral acid, which in an embodiment is concentrated sulfuric acid. In an embodiment, one or more treatment solutions may comprise greater than or equal to about 1 wt % sulfuric acid, or greater than or equal to about 10 wt %, or greater than or equal to about 30 wt %, or greater than or equal to about 50 wt %, or greater than or equal to about 95 wt %, or greater than or equal to about 98 wt % (i.e., concentrated sulfuric acid), or greater than or equal to about 99 wt %, i.e., fuming sulfuric acid. In an embodiment, oil is combined with about 0.5 wt %, or about 1 wt %, or about 2 wt %, or about 5 wt %, concentrated sulfuric acid, the material is mixed and then allowed to separate. The oil is then decanted and subject to further processing. Other suitable mineral acids include hydrochloric acid, nitric acid, phosphoric acid, acetic acid, or combinations thereof. In an embodiment, one or more of the treatment solutions comprise a caustic or basic solution 41 (i.e., having a pH greater than 10).

In an embodiment, one or more of the treatment solutions include an aqueous caustic wash solution comprising sodium or potassium hydroxide, sodium carbonate, sodium bicarbonate, and/or the like. In an embodiment, the purification step 31 comprises partitioning or otherwise contacting the recovered oil against one or more treatment solutions followed by a settling/separation step 37 comprising separating the purified oil from the treatment solution. The purification process may further include one or more drying steps 43, which may include distillation, flash evaporation, contacting the oil with a drying agent, and/or the like. The purification process may also include one or more filtration steps 45, wherein impurities are removed from the oil to produce the product reclaimed oil 33. Suitable filtration steps 45 may include polishing filters which utilize filtration media comprising various clays, diatomaceous earth, and/or the like.

In an embodiment, the recovered oil is partitioned against, or contacted with one or more treatment solutions, solvents, and/or the like utilizing a continuous extractor, operated co-currently or counter currently, a batch wise extraction, a stirred tank reactor coupled to a decanter, and/or the like, generally represented as item 35.

In an embodiment, the purification process may comprise, or may further comprise one or more absorption steps 47, each comprising contacting the recovered oil with an absorbent or adsorbent under conditions sufficient to remove impurities from the recovered oil and thus, further purify the recovered oil. The absorbent may be homogeneous with the oil, heterogeneous with the oil, or a combination thereof. The recovered oil may be contacted with the absorbent via plug-flow elutriation, percolation, filtration, in an agitated vessel, or a combination thereof. One or more of the absorption steps 47 may be followed by, or separated by, one or more separation steps 37, wherein the absorbent is separated from the oil and/or filtration steps 45 to produce the purified oil. The one or more absorption steps 47 may be followed by a filtration step 45 to remove fines and/or particulates remaining in the oil after the absorption step 47. Contact with the absorbent may further include chemical transformations in which impurities and/or other components present in the recovered oil are chemically altered by the absorbent to further purify the oil.

In an embodiment, the absorption step 47 of the purification process 31 may comprise contacting the recovered oil with an absorbent or adsorbent selected from the group consisting of activated carbon, zeolites, alumina, silica, an aluminosilicate, a phyllosilicate, a titanate, wood powder, a bleaching earth clay, an anion exchange resin, a cation exchange resin, and/or a combination thereof, under conditions sufficient to remove at least a portion of an impurity from the recovered oil. The absorbent may then be removed from the mixture in a separation step 37 and/or a filtration step 45, and then filtered via a polishing filter to produce the purified product reclaimed oil 33.

In an embodiment, the purification process may further comprise a regeneration step 51 wherein the absorbent separated from the recovered oil is regenerated to remove the impurities absorbed thereby, which may be followed by a recycling step 53, wherein the regenerated absorbent is recycled back into the purification process. For example, the recovered oil may be contacted with activated carbon at a temperature and for a period of time sufficient to remove at least one impurity from the recovered oil. The activated carbon may then be separated from the recovered oil via filtration and subsequently heated e.g., via contact with the combustion gas, and/or chemically treated to reactivate the material. The reactivated material may then be recycled back into the purification process.

In an embodiment, the purification process comprises contacting the recovered oil with an amount of activated carbon at a temperature, and for a period of time sufficient to reduce the color of the recovered oil by at least 0.5 Saybolt color units relative to the Saybolt color of the recovered oil prior to contact with the activated carbon, determined according to ASTM D156 or an equivalent thereof. In an embodiment, the purification process comprises contacting the recovered oil with an amount of activated carbon at ambient temperature, i.e., between about 20° C. and 35° C.

In an embodiment, the purification process may comprise, or may further comprise a reaction step 55, comprising contacting the recovered oil with a chemical reagent and/or catalyst under conditions sufficient to remove and/or chemically transform impurities present in the recovered oil to further purify the recovered oil, followed by one or more separation steps 37, filtrations steps 45, absorption steps 47, treatment steps 35, and/or the like to produce the product reclaimed oil 33. In an embodiment, the reaction step 55 of the purification process 31 comprises contacting the recovered oil with a chemical reagent and/or a catalyst selected from the group consisting of a mineral acid, hydrogen, ozone, a peroxide, an amine, a group 3-12 transition metal, a group 3-12 transition metal compound, a group 3-12 transition metal salt, and a combination thereof, under conditions sufficient to further purify the recovered oil.

For purposes herein, the various steps are shown in FIG. 1B in one of many possible arrangements for brevity. However, it is to be understood that the purification process 31 may comprise any one of the various steps, in any order, and/or any plurality of the various steps in any plurality of orders, as may be required to produce the product reclaimed oil. For example, in an embodiment, the purification process 31 may comprise one or more treatment steps 35, followed by one or more separation steps 37, followed by one or more drying steps 43, followed by one or more absorption steps 47, followed by one or more additional treatment steps 35, filtration/separation steps 37, drying steps 43, reaction steps 55 and so on, as may be required to produce the product reclaimed oil 33.

Figure 2:
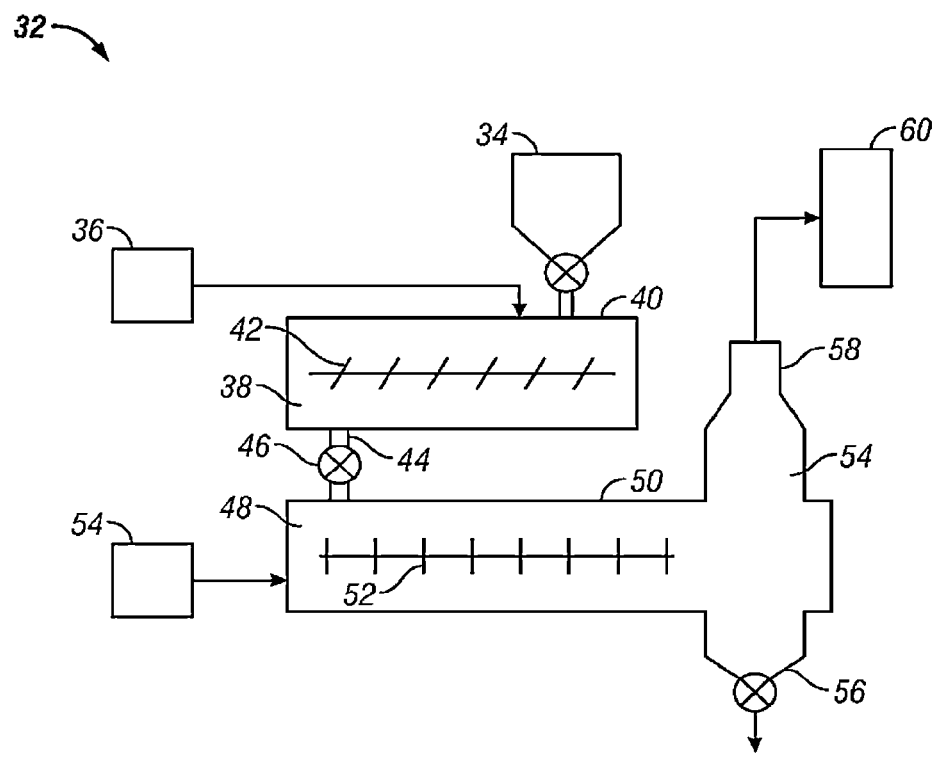
FIG. 2 is a schematic diagram of a chemical-direct thermal desorption apparatus for the upgrading, removal and recovery of oil from oil-based drill cuttings according to an embodiment.

FIG. 2 shows an embodiment of the apparatus, generally referred to as 32, wherein the substrate from substrate feed zone 34 and acid from acid feed system 36 are supplied to a peptizer 38 comprising a first housing 40 equipped with one or more high-shear agitators 42. The first housing 40 is preferably fixed and fluidly sealed. A transfer zone 44, preferably comprising a rotary valve 46 or other means to fluidly isolate the peptizing zone 38, is provided to supply the peptizate to an inlet end of thermal desorption zone 48 within second fixed housing 50 equipped with one or more turbulence-generating agitators 52. Burner 54 is provided to supply hot combustion effluent gas to the thermal desorption zone 48 to heat the peptizate and desorb oil from the sorbent material.

The second housing 50 is preferably a fixed horizontal cylinder equipped with a solids disengagement zone 54 opposite the inlet end of the thermal desorption zone 48 and a solids outlet 56 adjacent the disengagement zone 54 to receive disengaged solids therefrom. The solids disengagement zone 54 and solids outlet 56 are preferably spaced away from the agitator 52 to promote solid separation and settling, i.e., the agitator 52 preferably terminates adjacent the solids disengagement zone 54 and does not extend into the solids disengagement zone or above the solids outlet 56. The solids disengagement zone 54 may be provided with a hood 58 or other relatively large cross-sectional and/or low flow velocity plenum to promote solids settling and provide a solids-lean dilute phase for processing in vapor recovery system 60.

The Substrate

The substrate which is processed or treated according to various embodiments comprises liquid bound on or within a solid sorbent material, wherein the liquid comprises oil or a mixture of oil and water. Although the substrate to be treated is described herein with specific reference to drill cuttings as one example, and especially drill cuttings obtained from operations with oil-based drilling muds (oil based drill cuttings or OBDC), other contaminated or environmentally hazardous wastes or substrates can also be treated using the present methodology and apparatus, especially clay-containing wastes. Drill cuttings can contain large quantities of clay because the oil deposits and other strata typically have a high content of clay.

In one embodiment, the substrate can be provided by contacting a sorbent material containing acid-reactive component(s) with oil in a suitable oil-sorbent mixing device, for example, where the oil contains aromatics or has a relatively poor quality and it is desired to upgrade the oil according to the process of the present invention. In this embodiment, the process may include a separate oil-sorbent contacting step or the oil sorbent contacting may occur in the peptizer, e.g., in an oil-sorbent contacting zone upstream from the peptizing zone or a portion thereof. In an embodiment, the solids recovered from the thermal desorber can be recycled as the sorbent to the oil-sorbent contacting zone or step.

Suitable substrates include OBDC containing 50 wt % or less total liquids, based on the total weight of the substrate, wherein the substrate is generally free of free liquid, i.e., the liquid will not readily separate from the OBDC by gravity. In various embodiments, the substrate may contain less than or equal to about 35 wt % total liquids, less than or equal to about 30 wt % total liquids, less than or equal to about 25 wt % total liquids, less than or equal to about 20 wt % total liquids, less than or equal to about 15 wt % total liquids, or less than or equal to about 10 wt % total liquids, and may contain at least about 5 wt % oil, at least about 10 wt % oil, at least about 15 wt % oil or at least about 20 wt % oil, based on the weight of the substrate (liquid and sorbent). Substrates with greater amounts of oil can be processed according to the present embodiments, but, when economically possible, it may be desirable according to an embodiment to alternatively treat such substrates by other steps such as centrifugation, gravity settling, solvent extraction, or the like, prior to the instant process, to remove the bulk of the oil which may be readily removed by more conventional means.

If desired, in one embodiment, the substrate may be amended by the addition of lime or another acid-reactive component, e.g., where the substrate is deficient in acid-reactive components. OBDC normally have a pH in the range of about 10-12, and are sufficiently reactive with mineral acid to a pH in the intermediate peptized material and recovered devolatilized substrate of about 6-8. However, where the OBDC have an unusually low pH the process can benefit by the addition of alkaline earth, e.g. lime, to obtain a pH in the 10-12 range.

If desired, in another embodiment, the OBDC may optionally be pretreated, and/or treated in the peptizer, with a demulsifier such as dodecyl benzene sulfonate.

Peptizing

The peptizing of the substrate is a physical-chemical process in which the sorbent in the substrate is induced to quickly expand by contacting with one or more mineral acid reagents thereby increasing its volume to facilitate the disintegration or dispersion of agglomerated particles and expose surface area to facilitate the release of liquid in the subsequent thermal desorption step. Peptizing thus includes contacting the substrate with an amount of a mineral acid under high shear conditions within a peptizing zone.

In an embodiment, the mineral acid reagent, also referred to herein as the mineral acid, is added to the substrate in an amount sufficient to produce a peptizate having a pH between 6 and 8, preferably a pH between 6.5 and 7.5. The mineral acid may be added at between 1 wt % and 100 wt %, preferably between 2 wt % and 20 wt %, based on the total amount of substrate material present, to produce a peptizate. The mineral acid in one embodiment is typically added at 4 wt % to 10 or 12 wt %, based on the total weight of the substrate.

Importantly, the more water present in substrate the more acid is typically added. In an embodiment, the proportion of acid supplied to the peptizing zone can be employed as a temperature control tool in the thermal desorption zone, for example, if the steady state temperature of the thermal desorption zone increases or decreases due to decreased or increased water content of the OBDC supplied to the peptizer, then the acid addition rate may be respectively increased or decreased to account for the fluctuation. This can be an important control mechanism since the water content of the OBDC can vary considerably between and within batches, e.g., water may drain from the uppermost OBDC layers in the feed or storage hopper into the lower layers so that the lower layers may contain more water than the upper layers, or the upper layers may become wet from precipitation or humidity or other contact with water; and also because of the difficulty of adjusting the temperature of the combustion effluent gases supplied from the burner while maintaining low oxygen or substoichiometric oxygen:fuel ratios (fuel rich).

In addition, depending on the water content and the composition of the substrate, in one embodiment the amount of mineral acid added to produce a peptizate suitable for desorbing would result in a peptizate having a pH of less than 6. In an embodiment wherein the addition of an amount of mineral acid to produce a peptizate having a pH of 6 or less would not otherwise be suitable for desorption, additional acid and an alkaline reagent may be added to the peptizing zone in neutralizing amount, e.g., an amount of additional acid and alkaline reagent such as alkaline earth sufficient to produce a peptizate having a pH between 6 and 8. Where alkaline reagent is employed it is preferably added in an alternating stage or stages with the acid.

The acid may be diluted with water to achieve the desired result and/or control, but is preferably added as a concentrate or neat to obtain a higher temperature in the peptizate. Suitable mineral acids include, for example, sulfuric acid, oleum, phosphoric acid, nitric acid, hydrochloric acid, combinations thereof, and the like. In an embodiment, the mineral acid preferably comprises concentrated (98+wt %) sulfuric acid.

The mineral acid may be added to the substrate as it enters the peptizing zone, or may be added step wise in one or more stages during peptizing, under high shear mixing and/or kneading conditions. Examples of high shear conditions include those present in various kneaders, ribbon blenders, paddle mixers, and the like, known to one of skill in the art.

In an embodiment, the oil based drill cuttings and the mineral acid are contacted for a period of time and at conditions of temperature and shear sufficient to allow them to react chemically inasmuch as the OBDC are broken into smaller particles and/or a clay solid shale matrix may be expanded (e.g., intercalated, exfoliated, delaminated, opened, and/or the like) to permit the immigration of the inverse oil in water emulsion contained within the substrate to a point nearer to the surface of the particles.

Figure 3:
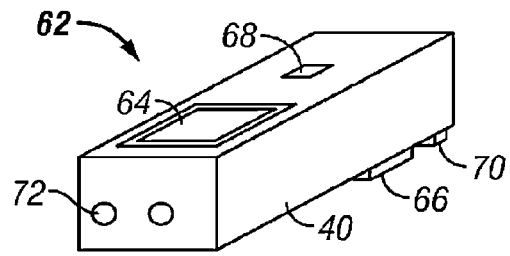
FIG. 3 shows a perspective view of a peptizer according to one embodiment.

In an embodiment, the substrate is preferably provided as a continuous stream into the peptizing zone. Peptizers such as those disclosed in my earlier patents U.S. Pat. Nos. 7,690,445, 7,481,878, 6,978,851 and 6,668,947, which are hereby incorporated herein by reference in their entireties for all purposes to the extent they are not inconsistent with the present disclosure, may be suitably employed. As shown in FIG. 3, in an embodiment, the peptizer 62 comprises the first housing 40 for the peptizing zone. The housing 40 is preferably fixed and includes an upper substrate inlet 64 at one end of the peptizer 62 and a lower solids outlet 66 (a discharge) at the other end of the peptizer 62. If desired, the acid may also be introduced in the inlet 64 with the solids. Optionally, peptizer 62 may include an upper exhaust vent 68 preferably in an upper surface adjacent substrate inlet 64, one or more additional ports 70 which may include steam inlets, acid reagent inlets, caustic reagent inlets, vapor outlets, liquid outlets, solids outlets, and/or the like, which may be located in an upper surface and/or a lower surface of peptizer 62 upstream of substrate inlet 64, between substrate inlet 64 and solids outlet 66 or downstream of the solids outlet as desired for co-current or countercurrent operation. In one embodiment, the vent 68 and port(s) 70, if present, are sealed so as to fluidly seal the peptizer 62, except that the vent 68 and port(s) 70 may be equipped with a pressure relief valve or rupture disk so as to prevent overpressuring the peptizer 62, e.g., in the event peptizer 62 is overheated above the boiling point of water or other liquid in the substrate, in which case the vent 68 or port 70 may be connected to the vapor recovery system 60 (see FIG. 2). Accordingly, in an embodiment, the peptizer 62 is in fluid isolation relative to the desorption zone 48 except for the transfer zone 44, rotary valve 46 and/or other means to fluidly isolate the peptizing zone 38 from the thermal desorption zone 48.

Figure 4:
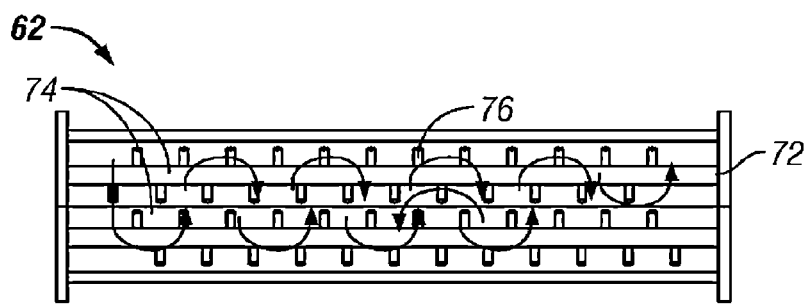
FIG. 4 schematically shows the generally longitudinal flow pattern inside the peptizer of FIG. 3.
Figure 5:
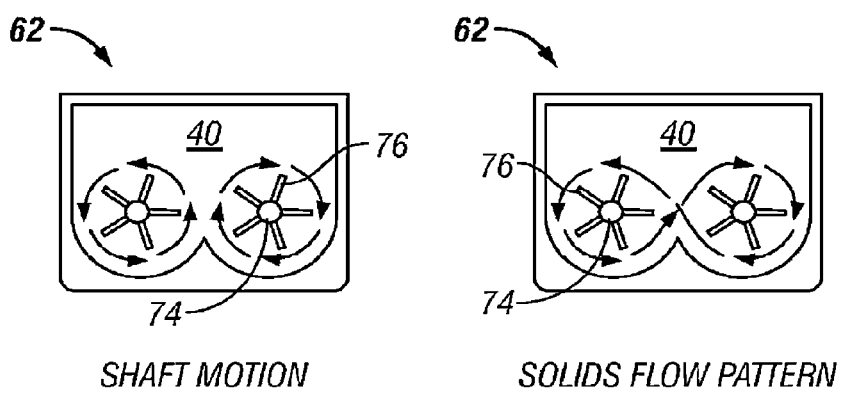
FIG. 5 shows the rotation of the shafts and the transverse flow patterns inside the peptizer of FIGS. 3 and 4.
Figure 6:
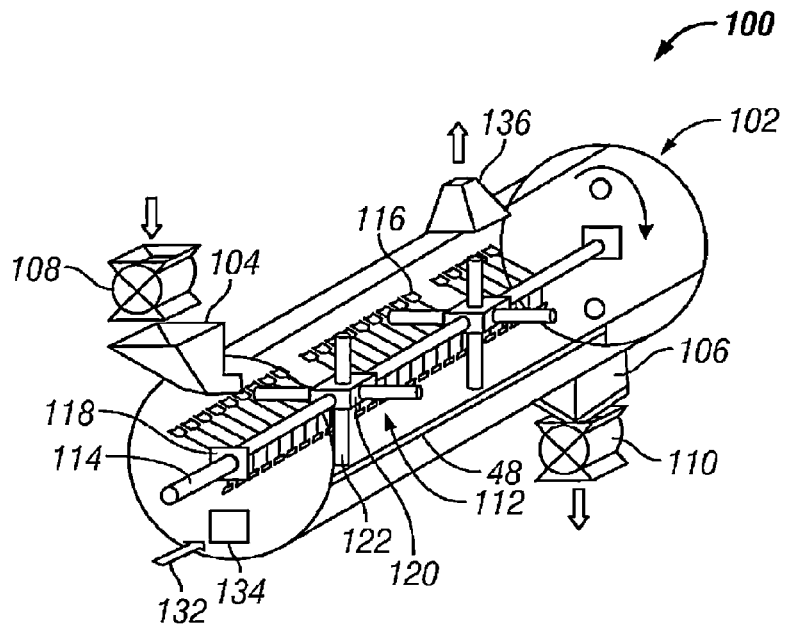
FIG. 6 shows a partial cut-away view of a thermal desorber according to an embodiment.
Figure 7:
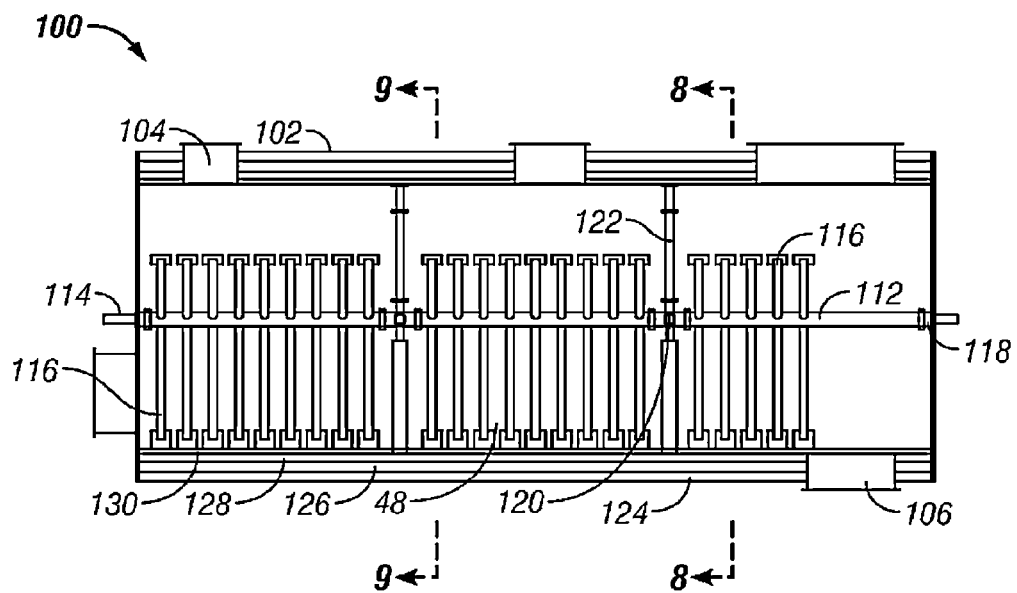
FIG. 7 shows a longitudinal sectional view in elevation of the thermal desorber of FIG. 6.

In an embodiment as best seen in FIGS. 3-5, the peptizer 62 comprises at least one agitator 72 to impart shear into the acid/substrate mixture. The agitator 72 may comprise a rotating shaft 74, preferably a pair of rotating shafts 74, longitudinally aligned in first fixed housing 40, which may be rotated in opposite or complementary directions. A plurality of paddles, pins, plows, blades and/or the like, referred to herein as blades 76, may be positioned along the length of shaft(s)

74. The blades 76 can be pitched to facilitate maximum shear conditions for agitation and/or movement of the solids in a forward and/or partial back-mixing within peptizer 62.

In embodiment, peptizer 62 is operated at a temperature of greater than or equal to about 50° C. and 200° C., preferably between about 70° C. and 100° C., more preferably between 75° C. and 90° C. In one embodiment, the peptizer 62 has a maximum operating temperature at or below the boiling point of the liquid bound to the substrate at an absolute pressure of 1.25 atmospheres, preferably below the boiling point of the bound liquid at atmospheric pressure; and in another embodiment, the peptizer 62 is operated at about atmospheric pressure, i.e., from about 0.9 to about 1.25 atmospheres absolute, or below atmospheric pressure, preferably from −0.1 to 0 atmospheres gauge. Subatmospheric pressure may be maintained in the peptizer 62, for example, by connecting vent 68 or a port 70 to an induced draft fan in vapor recovery system 60, or by sealing the inlet 64 and outlet 66 with suitable mechanical devices such as rotary valves which permit some vapor leakage or bypass from the peptizer 62 into a subatmospheric system such as where subatmospheric pressure is provided in thermal desorption zone 48 (see FIG. 2). In an embodiment, the peptizer 62 may heated or cooled to maintain the desired temperature. In a preferred embodiment, however, the peptizer 62 is insulated and operated adiabatically wherein the exothermic reaction between the acid reagent and acid-reactive materials in the substrate and/or heat of dilution of the acid reagent in the liquid present in the substrate feed provide internal heating. Where present, heating may occur through indirect heating e.g., via external application of a heat transfer medium, electrical heating, and/or the like.

FIGS. 4 and 5, respectively, show a schematic plan view of the movement of material in peptizer 62, and a schematic elevation of the movement of material in peptizer 62. The arrows in FIGS. 4 and 5 show the horizontal and vertical direction of the movement of the solids and the rotation of the shafts. If desired, baffles (not shown) may be positioned between adjacent blades 76. The peptizer 62 may further comprise a plurality of reactors or stages in sequence, either separate or within the same housing.

The internal design and construction materials for the peptizer 62 are preferably such as to resist extreme pH environments within the process, especially when heat is provided through direct or indirect heating of the peptizer 62 and/or via the exothermic reaction between the substrate and the mineral acid, the mineral acid and a caustic reagent, and/or the like. The peptizer is preferably comprised of stainless steel alloy.

The speed of the material throughput, as well as the specific materials used to manufacture the peptizer 62 may be selected to prevent the viscoelastic hydrocarbon and cuttings matrixes typical of oil based drill cuttings from sticking to the walls thereof. In an embodiment, the speed of agitator 72 is critical in creating particles suitable for the desorption step of the substrate contaminants. If the impeller speed is too slow, the substrate will not be adequately contacted with the reagents resulting in poor contact between the contaminated particles and the acid. If the speed of the impeller is too fast, energy is wasted with no improvement in reaction conditions including reduction in particle size and/or expanding of the particles of the substrate (i.e., the substrate) to be treated.

The moving speed at the tip of the blades 62 in one embodiment may ideally be between 2 and 8 m/s (7 and 26 ft/s) on rotation. More preferably, the tip speed is between 2 and 5 m/s (7 and 16 ft/s), and especially between 2.5 and 3.5 m/s (8 and 12 ft/s). As one example for a mixer treating 10 metric tons per hour of drill cuttings (5 m.sup.3/h or 180 ft.sup.3/h), the peptizer can have twin parallel shafts approximately 3 m (10 ft) long, running the length of the mixer, each with at least 30 paddles/shaft and a 0.4 m (1.3 ft) diameter. In another embodiment, the moving speed at the tip of the blades 62 is approximately 0.01 to 1 m/s, preferably about 0.2 m/s (0.7 ft/s) on the translation in both directions In an embodiment, the total residence time of the substrate within the peptizer 62 is less than or equal to about 2 minutes, preferably the residence time within the peptizer is between about 10 and 120 seconds, preferably less than 100 seconds, preferably less than 90 seconds, preferably less than 80 seconds, preferably less than 70 seconds, preferably less than 60 seconds, preferably less than 50 seconds, preferably less than 40 seconds, with less than 30 seconds being more preferred.

As one example for a reactor treating 30 metric tons per hour of drill cuttings (15 m.sup.3/h), the peptizer 62 has twin parallel shafts approximately 3.66 m (12 ft) long with 74 paddles/shaft and a 457 mm (18-in.) diameter. The total reaction (residence) time preferably does not exceed 60-80 seconds inside the reactor. The reaction process requires vigorous agitation. The energy for agitation in the peptizer 62 desirably does not exceed 1.12 kW (1.5 hp) per each metric ton of treated matrix per hour. For example, to treat 30 metric tons per hour of contaminated drill cuttings, the total power required for driving the peptizer agitator is preferably 33.6 kW (45 hp) or less.

The temperature at the inlet of the peptizer 62, which represents the thermal equilibrium of the mixed feeds (ignoring any heats of reaction and/or dilution) is preferably ambient to slightly above ambient, e.g., 20 to 30° C., although in one embodiment the substrate, the acid reagent and/or other feeds may be preheated. The temperature of material within the peptizer may increase due to the heat generated by the reaction of the mineral acid with the substrate being treated, by the heat of dilution of the mineral acid in the water present in the substrate, and/or via (optional) application of heat to the peptizer itself. The temperature at the exit of peptizer is preferably greater than or equal to about 70° C., and preferably less than or equal to about 100° C.

Thermal Desorption

In an embodiment as shown in FIG. 2, the peptizate is transferred from the peptizing zone 38 through the transfer zone 44 into the second housing 50 comprising the thermal desorption zone 48. The thermal desorption zone 48 is in fluid communication with burner 54 which supplies combustion effluent gas. In an embodiment, the combustion effluent gas comprises less than 1 vol % oxygen and is supplied to the thermal desorption zone at a temperature greater than 300° C.

In an embodiment, the thermal desorption zone 48 comprises an agitator 52 to create turbulent conditions and promote rapid heat transfer. The peptizate is mixed with the combustion effluent gas under turbulent conditions in the thermal desorption zone 48 to heat the peptizate and desorb at least a portion of the oil from the sorbent material. The mixture exiting the thermal desorption zone 48 is separated into a dilute phase comprising oil vapor from the sorbent and a dense phase comprising the sorbent, wherein the dense phase has an oil content which is less than the oil content of the sorbent material present in the feed substrate and/or in the peptizate.

In an embodiment, the temperature of the combustion effluent gas is sufficient to provide a temperature of the vapor phase exiting the desorber in a range from a lower limit of 180° C., 200° C., 220° C., 235° C., or 250° C. to a higher upper limit of up to 500° C., 400° C., 350° C., or 300° C. In general, the thermal equilibrium temperature of the dense phase solids recovered from the desorber is about 10° C. to 50° C. less than the dilute phase vapor, preferably 20° C. to 40° C. less, more preferably 25° C. to 35° C. less. In an embodiment, slightly negative pressure, for example, 0.8 to 0.99 atmospheres absolute or −0.01 to −0.2 atmospheres gauge, is continuously maintained in the thermal desorption zone, e.g., by withdrawing vapor or a dilute solids phase via an induced draft fan in the vapor recovery system 60, and if desired a safety valve such as a pressure relief valve and/or rupture disk can be provided in the case of overpressure, e.g., the safety valve can be calibrated at about 0.1 MPa gauge (about 14.7 psig) or 0.05 MPa gauge (7.35 psig) or 0.03 MPa gauge (4.4 psig) or 0.02 MPa gauge (3 psig).

In an embodiment, the average residence time in the thermal desorption zone 38 of the dense phase (e.g., the solids present in the peptizate) is less than or equal to about 5 minutes, preferably less than or equal to about 4 minutes, with less than or equal to about 3 minutes being still more preferred. In an embodiment, the average residence time in the thermal desorption zone of the dilute phase is less than 1 minute. In an embodiment, the temperature and residence time in the thermal desorption zone is sufficient to produce a processed solid having less than or equal to about 3 wt % residual oil, preferably less than or equal to about 2.5 wt % residual oil, preferably less than or equal to about 2 wt % residual oil, preferably less than or equal to about 1.5 wt % residual oil, preferably less than or equal to about 1 wt % residual oil, preferably less than or equal to about 0.5 wt % residual oil present, based on the total amount of solids and oil in the dense phase.

In an embodiment, the dense phase has an average amount of residual oil which represents greater than or equal to about a 50% reduction in oil compared to the oil content in the original substrate, preferably greater than or equal to about a 60% reduction, preferably greater than or equal to about a 70% reduction, preferably greater than or equal to about an 80% reduction, preferably greater than or equal to about a 90% reduction, preferably greater than or equal to about a 95% reduction in oil content compared to the oil content of the original substrate.

In another important embodiment, the oil is selectively devolatilized in the thermal desorption step and/or otherwise upgraded to improve one or more of the properties of the recovered oil relative to the oil in the OBDC or other substrate, such as, for example, lower aromatics content, lower sulfur content, lower functional group content, higher saturates, higher viscosity, higher viscosity index, and any combination thereof. Without being bound by theory, reactions that may occur in the thermal desorber include cracking, hydrocracking, steam cracking, hydrogenation, dehydrogenation, isomerization, etc. The combustion effluent gas may contain reactive species such as, for example, hydrogen, hydrocarbons, steam, carbon monoxide, carbon dioxide, and the like. In one embodiment, the combustion effluent gas is free of oxygen, e.g., less than 1 vol % oxygen, preferably less than 0.1 vol % oxygen.

In one embodiment, the OBDC or other substrate may act as a catalyst or as a support for catalysts, e.g., the peptization with acid may expose or form catalytically active surfaces in the sorbent material. In a further embodiment, the OBDC or other substrate may be amended by the addition of a catalyst such as one or more of zeolites, aluminates, silicates, aluminum silicates, noble metals, etc., added in the peptization step, the thermal desorber, a purification step, or a combination thereof.

In one embodiment of a method, oil to be upgraded may be contacted with the substrate and then subjected to turbulent, low oxygen, thermal desorption. In this embodiment, the solids recovered from the thermal desorber may be recycled for use as the substrate, or the substrate may be OBDC which are not saturated or are supersaturated with oil or an oil-water mixture, or the substrate may be a clay-containing solid or a solid containing any acid-reactive mineral or an oil upgrading catalyst. The oil may be a single phase or it may be an emulsion or invert emulsion. For example, the oil can be a waste oil, sludge, emulsion, etc., or a petroleum fraction. The oil-substrate mixture is optionally peptized with an acid reagent and/or optionally preheated to 70-100° C.

In an embodiment, a suitable thermal desorption zone may be dimensioned and arranged to process about 20 metric tons/hr of pretreated or peptized ODBC to produce a final material comprising less than or equal to about 2.5 wt % oil, less than or equal to about 1.5 wt % oil, or less than or equal to about 1 wt % oil, based on the total weight of the output material. In an embodiment, at least a portion of the oil present in the dilute phase is recovered in the vapor recovery system 60, and in various embodiments, the recovered oil comprises at least 50 wt % of the oil originally present in the substrate, or at least 60 wt % of the oil originally present in the substrate, or at least 65 wt % of the oil originally present in the substrate, or at least 70 wt % of the oil originally present in the substrate, or at least 75 wt % of the oil originally present in the substrate, or at least 80 wt % of the oil originally present in the substrate, or at least 85 wt % of the oil originally present in the substrate.

In an embodiment, heat is supplied directly to the thermal desorption zone 48 in the form of combustion effluent gas by the burner 54 which is discharged into the thermal desorption zone. In an embodiment, the burner 54 preferably includes a combustion chamber positioned such that the hot combustion effluent gas enters the thermal desorption zone 48, but the burner is spaced away from the thermal desorption zone such that the flame does not impinge directly on the sorbent so as to avoid excessive pyrolysis or combustion of the oil present in or with the peptizate. In an embodiment, the burner 54 may operate at stoichiometric or sub-stoichiometric oxygen levels to control the amount of oxygen entering the thermal desorption zone to avoid or limit combustion or other oxidation of the oil present in or with the peptizate. In an embodiment, oxygen is desirably excluded from the combustion effluent by setting the desired fuel rate to the burner, adjusting the air or oxygen-enriched air supplied to find the maximum flame temperature, and then slightly reducing the air or oxygen-enriched air to reduce the flame temperature, e.g., 5° C., 10° C., 20° C. or 30° C. below the maximum flame temperature. For example, the burner in one embodiment is supplied with 90 to 99 percent of stoichiometric air, preferably 95 to 98 percent of stoichiometric air.

If desired, a temperature moderator such as supplemental water and/or steam may be injected into the combustion effluent gas to moderate the temperature within the thermal desorption zone 48 to avoid overheating of the material being treated therein. Any suitable fuel supply may be used, e.g., natural gas, fuel oil, recovered process oil, or a combination thereof. The combustion effluent gas may be supplied to the thermal desorption zone at a temperature from about 300° C. to about 1200° C.

In an embodiment, as shown in FIGS. 6-9, the thermal desorption zone 48 is located within a desorber 100 which includes a generally cylindrical fixed housing 102. The peptizate inlet 104 and solids outlet 106 are preferably controlled by respective rotary valves 108, 110 (see FIG. 6) or other similar device to prevent oxygen from entering and/or hydrogen, carbon monoxide and hydrocarbon vapors from exiting the otherwise fluidly sealed desorber 100. An agitator 112 comprises a rotating shaft 114 and a plurality of radially extending paddle assemblies 116. The shaft 114 is centrally located, extends longitudinally through the desorber 100 and is supported by end bearings 118 and intermediate bearings 120 carried on bearing support assemblies 122. The end bearings 118 should be sealed to inhibit fluid communication outside the desorber 100.

Figure 8:
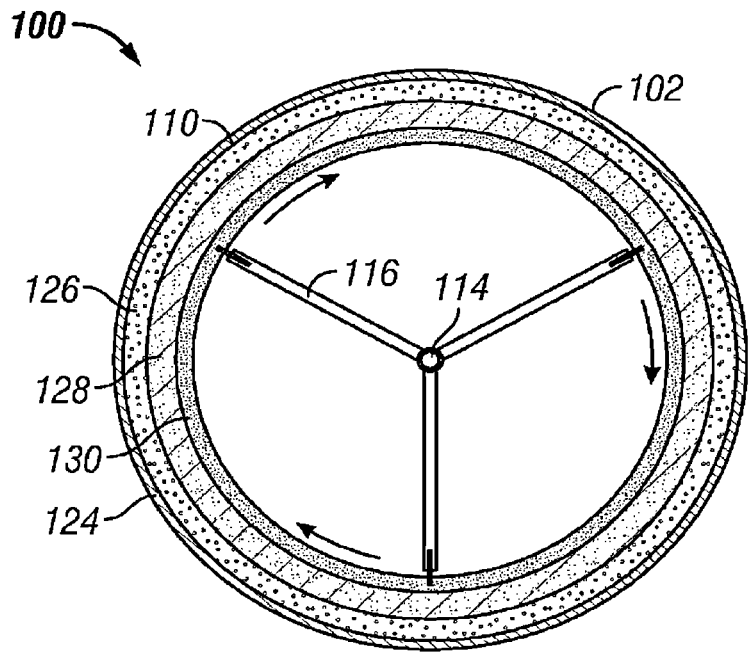
FIG. 8 is a sectional view showing the agitator paddles in the thermal desorber of FIG. 7 as seen along the lines 8-8.
Figure 9:
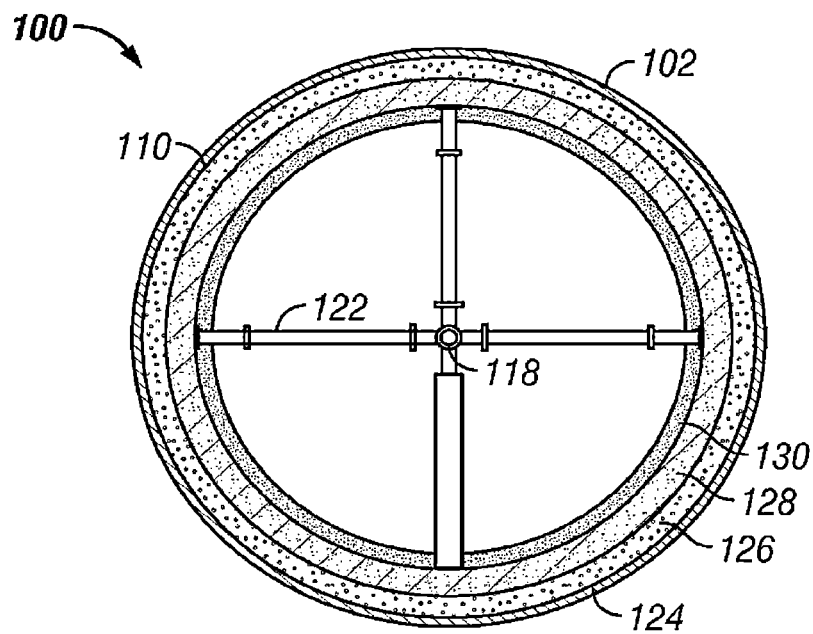
FIG. 9 is a sectional view showing the agitator supports in the thermal desorber of FIG. 7 as seen along lines 9-9.

As shown in FIGS. 8-9, the housing 110 may optionally be refractory-lined and include, for example, a coaxial steel outer wall 124 and/or one or more refractory linings such as outer refractory layer 126, inner refractory layer 128 and surface layer 130. The outer refractory layer 126 in one embodiment is a concrete layer formed from steel-reinforced gypsum cement, and inner layer 128 in an additional or alternate embodiment comprises a cast refractory or refractory bricks. Skin layer 130 is disposed between an inner surface of layer 128 and the cylindrical surface defined by the rotation of the paddle assemblies 116 about the shaft 114, and may be formed in situ by the deposition of substrate particles which become baked onto the surface of layer 128. Additional insulation materials e.g., cast or brick refractory materials, insulation, sound abatement materials, and the like, may be employed inside or outside the unit to further improve the efficiency of the unit by attenuating the escape of heat.

In an embodiment, the combustion effluent gas 132 may enter the desorber 100 at a hot gas inlet 134 located in a lower portion of the inlet end below the peptizate inlet 104 and pass co-currently with the solids to gas outlet 136 located above the solids outlet 106. Co-current flow facilitates movement of the solid particles toward the exit location and also facilitates temperature moderation in the thermal desorption zone, which may be helpful to avoid or minimize coke or carbon formation from oil residue which can otherwise occur if the temperature within the thermal desorption zone 48 is too high, which can in-turn inhibit mass transfer and lead to losses in the amount of oil that can be recovered. The presence of coke or carbon deposits on the treated solids can also discolor the treated solids, e.g., gray or black, which may serve as an indication to one of skill in the art that the internal temperature is too high for a particular application. In an alternate embodiment, the gas and solids may enter and exit from opposite ends in a countercurrent configuration.

In an embodiment, the shaft 114 is preferably rotated such that the tip speed of the paddle assemblies 116 is between 0.1 and 20 m/s, preferably between 0.5 and 10 m/s, more preferably between 1 and 8 m/s, and more preferably between 2 and 6 m/s. The rotation creates turbulence within the thermal desorption zone to improve the gas-solid contact of the substrate undergoing the desorption step with the hot gases and thus to promote heat and mass transfer, reducing the residence time required to complete the desired heat and mass transfer within the thermal desorption zone. Insufficient agitation can increase the residence time needed or reduce the efficiency of the oil recovery. Too much agitation can unnecessarily increase the power requirements, speed wear and tear on the equipment and produce excessive fines which are undesirably entrained in the dilute phase and can lead to problems with fines removal or plugged lines and equipment in the vapor recovery system 60.

The paddle assemblies 116 can be pitched as desired to advance the solids material through the desorber 100, but are preferably not pitched. Similarly the desorber 100 can be sloped to facilitate or inhibit the movement of solids through the unit, but is preferably level. The turbulence in the desorber 100 and the relatively high velocity of the gas through the unit are preferably sufficient to advance the solids to the solids outlet 106. The space above the solids outlet 106, which is preferably located through a lower surface of the desorber 100, is desirably free of rotating paddle assemblies 116 so as to promote solids disengagement from the dilute phase or vapor. Solids disengagement is also promoted by providing an exit conduit or hood 58 of relatively large cross sectional area so as to reduce the flow velocity and allow solids to settle, i.e., where the fines entrainment is limited to particles having a terminal velocity which is less than the velocity of the exiting vapor. Increasing the height of the hood 58 and limiting agitation in the space below and/or adjacent to the vapor outlet 136 can also be beneficial to promoting solids disengagement.

The dilute phase produced in the thermal desorption zone may comprise fluidized solid particles of the sorbent and other materials. It is generally desirable to minimize solids entrainment in the dilute phase. Therefore, in one embodiment, the desorber 100 comprises a solids disengagement zone 54 having a relatively low velocity and turbulence relative to other areas of the thermal desorption zone, which allows entrained particles to drop out of the dilute phase before exiting the thermal desorption zone. The solids disengaged in the solids disengagement zone are returned to the solids adjacent a bottom surface of the thermal desorption zone and discharged from the thermal desorption zone at a solids discharge 51. In an embodiment, solids discharge 51 may comprise a desorber outlet rotary valve 44. Disengagement zone 96 may also comprise an impingement plate, demister or similar devices (not shown), to facilitate solids disengagement from the dilute phase.

In an embodiment, the first fixed housing and the second fixed housing are located in a single housing, separated from one another. In another embodiment, the thermal desorption zone is a different type of reactor which achieves the same mass and energy transfer under high shear or turbulent conditions to mix and heat the solids being treated with the combustion effluent gas, such as, for example, a fluid bed reactor, a moving bed reactor, a riser reactor, any combination thereof, or the like.

The solids are recovered from the thermal desorber below the solids disengagement zone. A rotary valve may be used to inhibit gas from escaping from the desorber and air from entering the desorber. If desired, the solids may be sprayed with water for cooling and/or dust control or to enhance the desired water content of the solids. In one embodiment, the recovered solids from the thermal desorber have a particle size distribution comprising 90 wt % or more of the particles having a mesh size greater than 200 mesh, e.g., 90 wt % or more greater than 74 microns, and alternatively or additionally at least 80 wt % of the particles having a mesh size less than 40 mesh, e.g., 80 wt % or more smaller than 420 microns. The solids may be further processed to remove additional oil, or may be disposed of, e.g. solids containing less than 1 wt % oil can usually be disposed of in an environmentally responsible manner.

Vapor and Oil Recovery

In an embodiment, the dilute phase exiting the solids disengagement zone of the thermal desorber may comprise some entrained fines, desorbed hydrocarbons (e.g., oil) and water (steam), in addition, of course, to the combustion gas effluent and any gaseous reaction products. The dilute phase may also comprise combustion gas produced by the burner. The dilute phase may further include particulate matter, which is entrained in the dilute phase during thermal desorption. The dilute phase leaving the thermal desorber is typically at a temperature between 100° C. and 800° C., preferably greater than or equal to about 150° C., preferably between 180° C. and 350° C., more preferably about 180° C. to about 325° C.

or more preferably between 200° C. and 300° C. The volume the dilute phase depends on the feed rate through the thermal desorption zone, the temperature of the thermal desorption zone, the amount initially present in the substrate, the amount of materials added during the process, and the like.

In an embodiment, dilute phase may be further processed in a vapor recovery system 60 comprising various separation and purification devices, heat exchange devices, gas-liquid contact devices, scrubbers, decanters, and the like, to remove particular matter present in the dilute phase, to condense and recover the hydrocarbons and/or water present in the dilute phase, to recover heat present in the dilute phase for subsequent use in the process or elsewhere, and/or the like.

Figure 10:
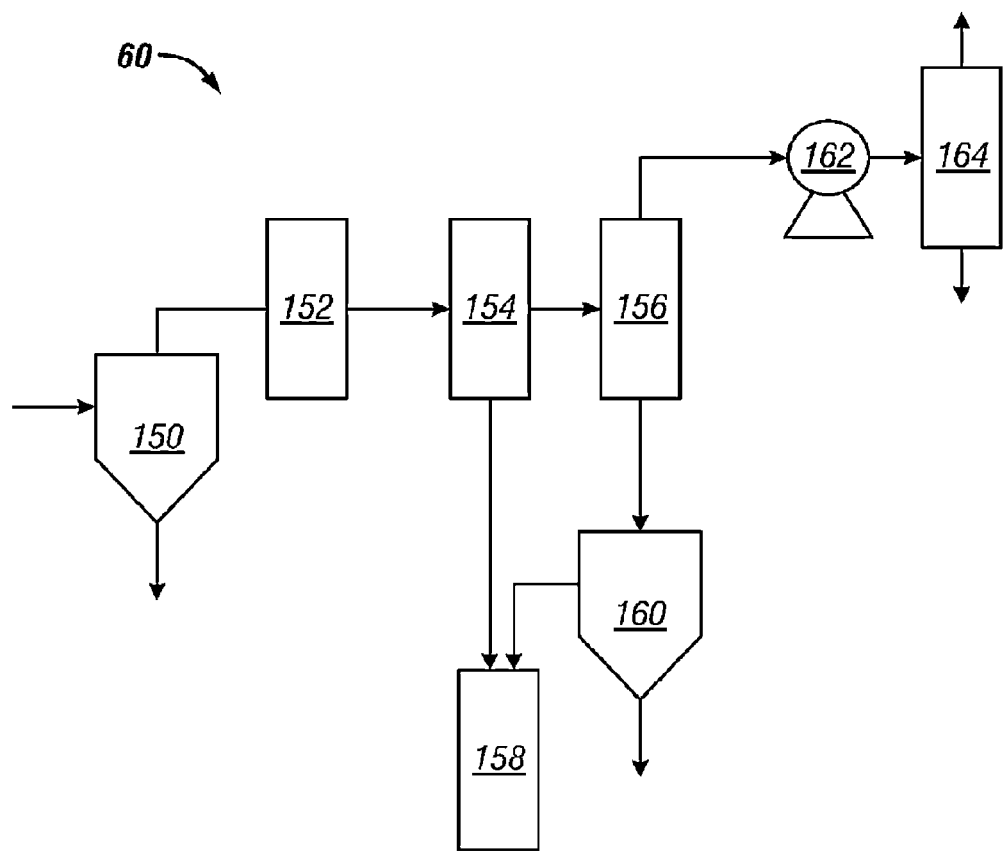
FIG. 10 is a schematic overview of a vapor recovery system according to one embodiment.

Represented generally as 60 in FIG. 2, and as shown in FIG. 10, vapor recovery system 60 may include one or more of a cyclone 150, knock down tower 152 or other gas-solids separator or combination thereof, and/or the like, to remove any entrained particulate solids. If solids, especially sub 4-micron particles, are not removed and are present in the oil-water condensate, a rag emulsion may form which can be difficult to remove. The cyclone may include a number of stages, e.g., primary, secondary, tertiary cyclone stages, etc., wherein each successive stage removes smaller and smaller particles. Suitable gas-solid separators in various embodiments may alternatively or additionally include gravity settling chambers, impingement separators, cyclone separators, mechanical centrifugal separators, granular-bed separators, bag filters, scrubbers, electrostatic precipitators, air filters, and the like, including combinations.

The fines-lean vapor from the cyclone 150 and/or tower 152 may be further treated to remove hydrocarbons and other condensables via heat recovery and condensation. For example, the vapor may be cooled and condensate removed at a temperature above the boiling point of water in high temperature condenser 154, and then cooled and condensed in a low temperature condenser 156 at a temperature below the boiling point of water. The condensate from high temperature condenser 154 comprises hydrocarbons having a boiling point above that of water, and is preferably essentially free of water, e.g., less than 1000 ppmw water or less than 100 ppmw water, and may be collected in a recovered oil tank 158. The condensate from the low temperature condenser 156 may contain both oil and water and can be collected in a gravity separator 160 for recovery of respective oil and water streams. The oil stream from separator 160 may be collected together with other recovered oil in tank 158, or it may be a separate product stream of hydrocarbons with a relatively low boiling point or other specified characteristics. The water from the separator 160 may be further treated for disposal if needed, or recirculated as process or cooling water.

The non-condensed vapors from condenser 156 may optionally be exhausted via induced draft fan 162 and scrubber 164 to remove any residual particulates, $NO_x$, $SO_x$, CO, $CO_2$, other pollutants or the like. Alternatively or additionally, the vapor may be burned as fuel gas or, since it may contain appreciable amounts of hydrogen, carbon monoxide and/or carbon dioxide, used as a synthesis gas for any suitable process that can utilize the gaseous reactants therein.

In an embodiment, at least a portion of the heat contained in the dilute phase exiting the thermal desorption zone, or anywhere along the vapor separation system, may be recovered. In an embodiment, recovered heat may be used to preheat the air used to produce the combustion effluent gas for the process. This may be done using a gas-gas indirect heat exchanger (not shown), a steam condensation loop (not shown), or the hot gases may be supplemented with oxygen and utilized again in the combustion process (not shown).

Transportability

In an embodiment, the apparatus may be portable. The various components may be mounted on one or more platforms, also referred to in the art as "skid mounted", "truck mounted", or the like, such that the apparatus may be transported on a US Interstate highway either as a single unit, or on a plurality of platforms which are interconnected at the intended destination. The platforms may include wheels, brakes, signals and the like (e.g., truck mounted on a flat-bed trailer) suitable for transport on a US Interstate highway, or the platforms may be mountable on a truck bed or rail car (skid mounted). In an embodiment, the one or more platforms are dimensioned and arranged for transportation such that each of the mounted platforms has a total width of less than 2.59 meters (102 inches), a total length of less than 13.71 meters (45 feet) and a total height of less than 4.27 meters (14 feet).

In an embodiment, the first and second housings and the burner are mounted on a first platform such that the mounted first platform has a total width of less than 2.6 meters (102 inches), a total length of less than 13.7 meters (45 feet) and a total height of less than 4.2 meters (13.5 feet). In embodiments, the vapor recovery system is mounted on the first platform, or is mounted on a second platform of similar overall dimensions.

Figure 11:
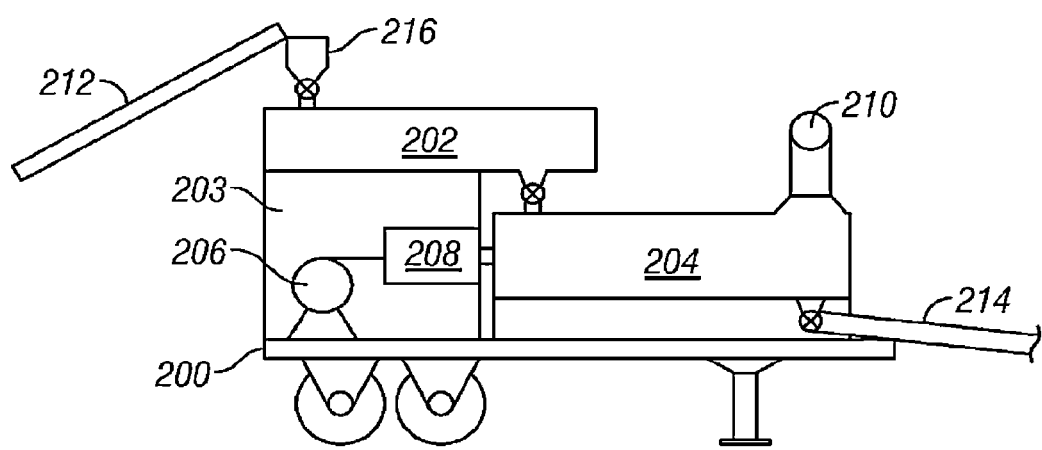
FIG. 11 is a schematic side elevation of a first transportable unit configured for operation according to an embodiment.
Figure 12:
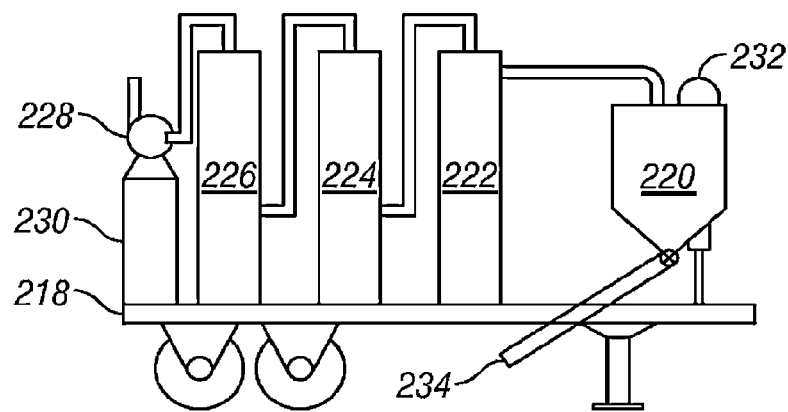
FIG. 12 is a schematic side elevation of a second transportable unit configured for operation according to an embodiment.

In one representative configuration as seen in FIGS. 11-14, wheeled trailer 200 configured for operation in FIG. 11 has mounted thereon peptizer 202 positioned on support structure 203 over desorber 204, forced draft fan 206 connected to firebox 208 and gas outlet pipe 210. Also, in operation conveyors 212, 214 are positioned to supply OBDC to feed hopper 216 and to remove solids from the discharge from desorber 204. Wheeled trailer 218 configured for operation in FIG. 12 has mounted thereon cyclone 220, knock-out tower 222, high temperature condenser 224, low temperature condenser 226 and induced draft fan 228 positioned on support structure 230. In operation the desorber gas outlet pipe 210 is connected to the cyclone inlet pipe 232, and a conveyor 234 may be provided to remove fines from the bottom of the cyclone 220.

Figure 13:
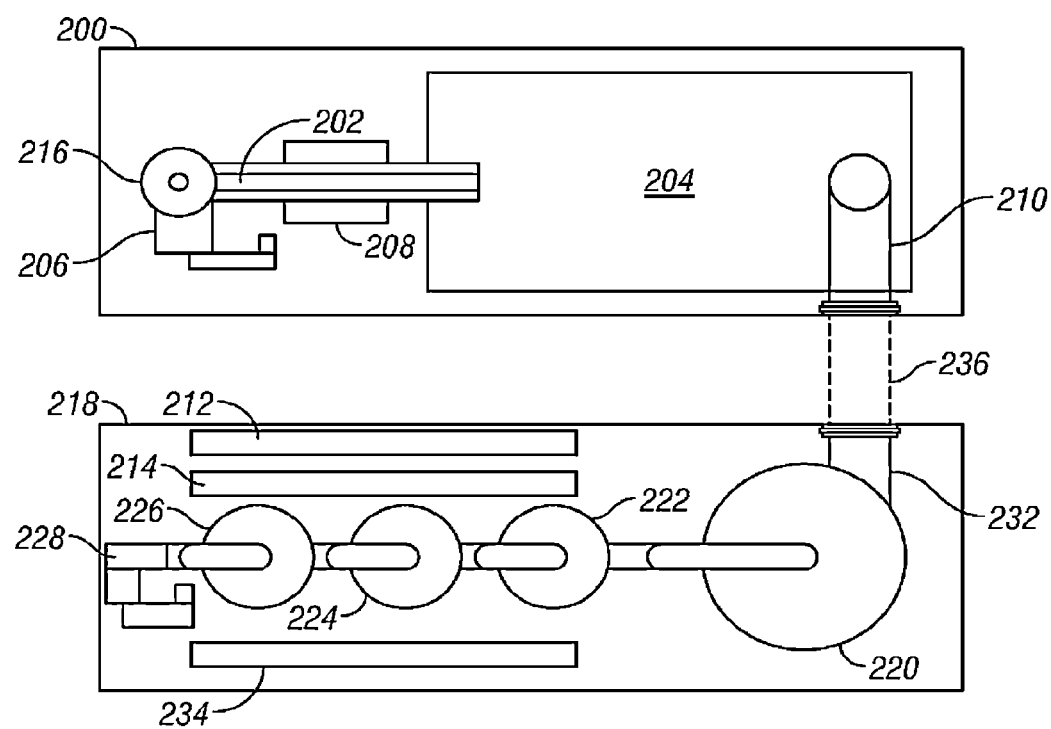
FIG. 13 is a schematic plan view of the first and second transportable units of FIGS. 11-12 configured for transport according to an embodiment.
Figure 14:
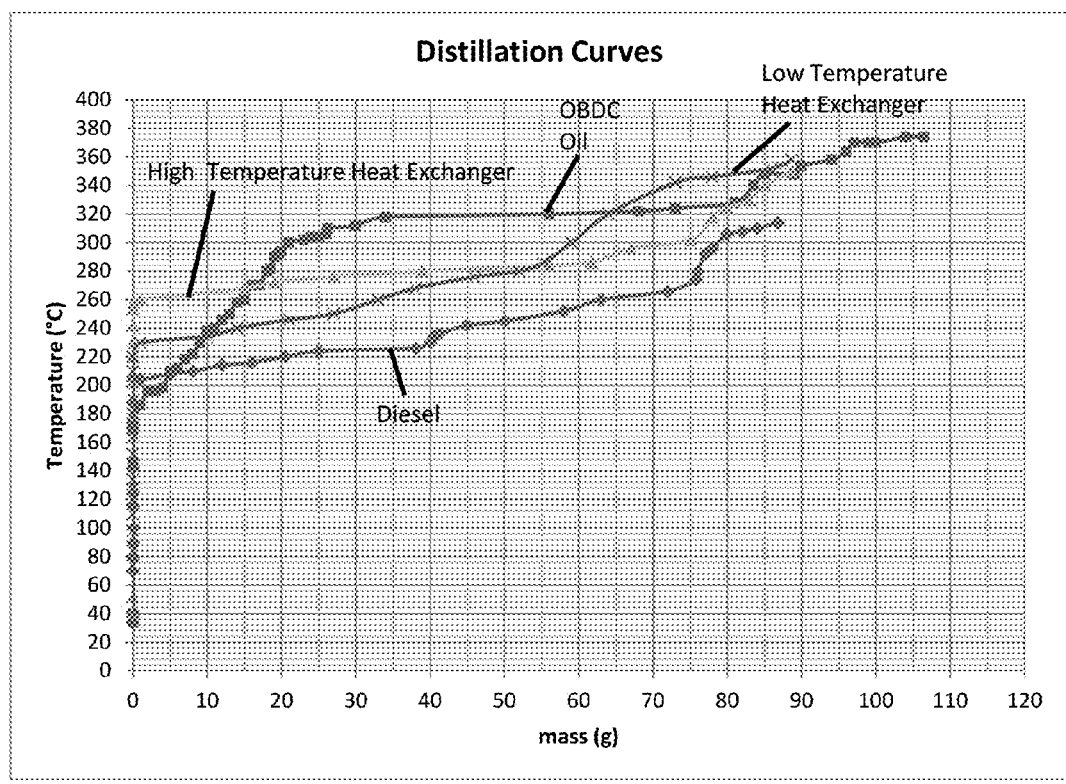
FIG. 14 is a graphical representation of distillation curves of oil examples according to an embodiment and comparative oil examples.

In transport mode as shown in FIGS. 13-14, the major equipment, e.g., peptizer 202, desorber 204, fan 206, firebox 208, cyclone 220, tower 222, condensers 224, 226 and fan 228, may be mounted in operating position and configuration, and, if desired, connecting lines such as connector piece 236 and more portable equipment such as conveyors 212, 214, 234 may be disconnected and secured to the trailers 200, 218 where there is space allowed. If desired or if needed, some of the major equipment pieces may also be disassembled and secured on the trailers 200, 218 to accommodate height, width or length restrictions.

Upon arrival at the site for treatment of ODBC, the conveyers 212, 214, 234, transfer line 236 and any other disassembled equipment are connected and installed for operation. Oil collection, gravity settling, water collection, etc., may be accomplished using fixed or portable tanks, e.g., tank trucks. When the solids treatment is completed, the rig can be configured for transport and trucked to a new job location.

Reclaimed Oil

In an embodiment, the product reclaimed oil according to the present disclosure is recovered or produced via thermal desorption from a peptized substrate comprising an oil or a mixture of oil and water bound on a solid sorbent material. For purposes herein, a reclaimed oil recovered or produced via thermal desorption from a peptized substrate includes any oil produced according any one or combination of embodiments of the methods disclosed herein. In an embodiment, the product reclaimed oil according to the present disclosure is recovered or produced via thermal desorption from a peptized substrate comprising less than about 35 wt % of an oil or a mixture of oil and water bound on a solid sorbent material. In an embodiment, the reclaimed oil has a total BTEX concentration of less than 1 wt %, or less than 0.5 wt %, or less than 0.1 wt %, determined according to ASTM D-5790, EPA Method SW846, or an equivalent thereof.

In an embodiment, the product reclaimed oil has a kinematic viscosity at 20° C. of less than or equal to about 10 cSt, or less than or equal to about 7 cSt, or less than or equal to about 5 cSt, or less than or equal to about 3 cSt, or less than or equal to about 2 cSt, determined according to ASTM D445 or an equivalent thereof; and/or in an embodiment, the product reclaimed oil has a kinematic viscosity at 40° C. of less than or equal to about 5 cSt, or less than or equal to about 4 cSt, or less than or equal to about 3 cSt, or less than or equal to about 2 cSt, or less than or equal to about 1 cSt, or less than or equal to about 0.5 cSt, determined according to ASTM D445 or an equivalent thereof.

In an embodiment, the product reclaimed oil has an initial boiling point which is greater than or equal to about 10° C., or greater than or equal to about 20° C., or greater than or equal to about 30° C., or greater than or equal to about 40° C. higher than an initial boiling point of diesel, and/or the product reclaimed oil has an end or final boiling point (i.e., not including the residual components, as defined in ASTM D86) which is greater than or equal to about 10° C., or greater than or equal to about 20° C., or greater than or equal to about 30° C., or greater than or equal to about 40° C. higher than an end boiling point of diesel, when determined according to ASTM D86 or an equivalent thereof. In an embodiment, the product reclaimed oil has an initial boiling point of greater than or equal to about 170° C., or greater than or equal to about 180° C., or greater than or equal to about 190° C. or greater than or equal to about 200° C. and an end boiling point of greater than or equal to about 320° C., or greater than or equal to about 350° C., or greater than or equal to about 370° C., or greater than or equal to about 400° C., or greater than or equal to about 410° C., or greater than or equal to about 420° C. wherein the initial boiling point and the end boiling point are determined according to ASTM D86 or an equivalent thereof.

In an embodiment, the product reclaimed oil has an aniline point which is greater than the aniline point of diesel. In an embodiment, the product reclaimed oil has an aniline point of greater than or equal to about 69° C., or greater than or equal to about 70° C., or greater than or equal to about 72° C., or greater than or equal to about 75° C., when determined according to ASTM D611 or an equivalent thereof.

In an embodiment, the product reclaimed oil comprises greater than or equal to about 2 ppm by weight of organically bound nitrogen, or greater than or equal to about 5 ppm, or greater than or equal to about 10 ppm, or greater than or equal to about 50ppm, or greater than or equal to about 100 ppm, determined according to ASTM D4629 or an equivalent thereof.

In an embodiment, the product reclaimed oil comprises greater than or equal to about 100 ppm, or greater than or equal to about 200 ppm, or greater than or equal to about 500 ppm, or greater than or equal to about 1000 ppm of total sulfur by weight, determined according to ASTM D5453 or an equivalent thereof.

In an embodiment, the product reclaimed oil has a flash point of greater than or equal to about 99° C., or greater than or equal to about 100° C., or greater than or equal to about 105° C., determined using the Pensky-Martens closed cup analysis according to ASTM D93 or an equivalent thereof.

In an embodiment, the product reclaimed oil has a freezing point (according to aviation fuels) of less than or equal to about 0° C., or less than or equal to about −5° C., or less than or equal to about −10° C., determined according to ASTM D2386 or an equivalent thereof.

In an embodiment, the product reclaimed oil has a pour point of less than or equal to about −20° C., or less than or equal to about −30° C., or less than or equal to about −35° C., determined according to ASTM D97 or an equivalent thereof.

In an embodiment, the product reclaimed oil has a density at 15° C. of greater than or equal to about 0.82 and/or less than or equal to about 0.85, determined according to ASTM D287 or an equivalent thereof.

In an embodiment, the product reclaimed oil has a relative evaporation rate (n-butyl acetate=1) of less than or equal to about 0.01, or less than or equal to about 0.008, or less than or equal to about 0.007, determined according to ASTM D3539 or an equivalent thereof.

In an embodiment, the product reclaimed oil has a vapor pressure at 20° C. of less than or equal to about 0.1, or less than or equal to about 0.8, or less than or equal to about 0.6, or less than or equal to about 0.5 torr, determined according to ASTM D2889, calculated API vapor pressure (Reid vapor pressure), or an equivalent thereof.

In an embodiment, the product reclaimed oil has a relative evaporation rate (n-butyl acetate=1) of less than or equal to about 0.01, or less than or equal to about 0.008, or less than or equal to about 0.007, determined according to ASTM D3539 or an equivalent thereof.

In an embodiment, the product reclaimed oil has a Kauri-Butanol value of greater than or equal to about 20, or greater than or equal to about 25, or greater than or equal to about 30, determined according to ASTM D1133 or an equivalent thereof.

In an embodiment, the product reclaimed oil has a bromine number of less than or equal to about 5, or less than or equal to about 3, or less than or equal to about 2, or less than or equal to about 1 by electrometric titration, determined according to ASTM D1159 or an equivalent thereof.

In an embodiment, the product reclaimed oil has a water content of less than or equal to about 0.01 wt %, or less than or equal to about 0.008 wt %, or less than or equal to about 0.007 wt % by Karl Fischer titration, determined according to ASTM E203 or an equivalent thereof.

In an embodiment, the product reclaimed oil comprises an increased amount of long chain methylene $CH_2$ protons relative to the amount of long chain methylene $CH_2$ protons present, on-average in diesel. In an embodiment, the product reclaimed oil comprises greater than or equal to about 45 wt %, or greater than or equal to about 47 wt %, or greater than or equal to about 49 wt %, or greater than or equal to about 50 wt %, or greater than or equal to about 52 wt %, long chain methylene $CH_2$ protons having a $^1H$ NMR chemical shift greater than or equal to about 1.00 to 1.50 ppm relative to trimethylsilane in $CDCl_3$, based on the total number of protons present (e.g., wt % based on the integrated area of the methylene $CH_2$ protons having a $^1H$ NMR chemical shift greater than or equal to about 1.00 to 1.50 ppm relative to trimethylsilane in $CDCl_3$, in proportion or relative to the total integrated area of all protons present in the oil obtained measuring a $^1H$ NMR spectrum of the oil), and/or in an embodiment, the product reclaimed oil comprises less than or equal to about 12 wt %, or less than or equal to about 10 wt %, or less than or equal to about 8 wt %, or less than or equal to about 5 wt % $CH_2/CH$ protons located beta to an aromatic carbon having a $^1H$ NMR chemical shift from greater than 1.50 to about 2.00 ppm relative to trimethylsilane in CDCl$_3$, based on the total number of protons present.

In an embodiment, the product reclaimed oil comprises greater than or equal to about 3.5 wt % or greater than or equal to about 4 wt %, or greater than or equal to about 4.5 wt %, or greater than or equal to about 5 wt % aromatic protons having a $^1$H NMR chemical shift of greater than or equal to about 6.50 to about 8.50 ppm relative to trimethylsilane in CDCl$_3$, based on the total number of protons present.

In an embodiment, the product reclaimed oil comprises greater than or equal to about 1 wt %, or greater than or equal to about 1.5 wt %, or greater than or equal to about 2 wt % poly-nuclear aromatic protons having a $^1$H NMR chemical shift of greater than or equal to about 7.50 to about 9.00 ppm relative to trimethylsilane in CDCl$_3$, based on the total number of protons present; and/or less than or equal to about 0.4 wt %, or less than or equal to about 0.3 wt %, or less than or equal to about 0.2 wt %, or less than or equal to about 0.1 wt % aromatic protons having a $^1$H NMR chemical shift of greater than or equal to about 4.50 to about 6.00 ppm relative to trimethylsilane in CDCl$_3$, based on the total number of protons present.

In an embodiment, the product reclaimed oil comprises less than or equal to about 0.5 wt %, or less than or equal to about 0.4 wt %, or less than or equal to about 0.1 wt %, or less than or equal to about 0.01 wt %, or is essentially void of ether protons having a $^1$H NMR chemical shift of greater than or equal to about 3.50 to about 4.00 ppm relative to trimethylsilane in CDCl$_3$, based on the total number of protons present.

In an embodiment, the product reclaimed oil comprises less than or equal to about 0.9 wt %, or about less than or equal to 0.5 wt %, or less than or equal to about 0.3 wt %, protons, located alpha to an aromatic carbon having a $^1$H NMR chemical shift of greater than or equal to about 2.00 to about 3.50 ppm relative to trimethylsilane in CDCl$_3$, based on the total number of protons present.

In an embodiment, a fluid comprising a water-in-oil emulsion comprising a surfactant system, an aqueous phase, and from about 50 wt % to about 95 wt % of the product reclaimed oil as the continuous phase has an electrical stability determined according to API 13B-2, or an equivalent thereof, which is greater than or equal to about 100V, or greater than or equal to about 150V, or greater than or equal to about 200V, or greater than or equal to about 250V, or greater than or equal to about 300V greater than an identically determined electrical stability of an essentially identical water-in-oil emulsion in which the reclaimed oil is replaced with diesel fuel.

In an embodiment, a fluid comprising a water-in-oil emulsion comprising a surfactant system, an aqueous phase, and from about 50 wt % to about 95 wt % of the product reclaimed oil as the continuous phase has an electrical stability determined according to API 13B-2, or an equivalent thereof, which is greater than or equal to about 1000V, or greater than or equal to about 1050V, or greater than or equal to about 1100V, or greater than or equal to about 1150V, or greater than or equal to about 1200V.

Embodiments

Accordingly, the invention provides the following embodiments:

E1. A method comprising:
(a) peptizing an acid-reactive substrate at a temperature between about 70° C. and about 105° C. with an acidic reagent under shear to obtain a peptizate having increased surface area, wherein the substrate comprises liquid bound on a solid sorbent material, wherein the liquid comprises oil or a mixture of oil and water, wherein the bound liquid comprises less than about 35 wt % of the substrate;
(b) cocurrently mixing the peptizate with a combustion effluent gas under turbulent conditions in a thermal desorption zone to heat the peptizate and desorb at least a portion of the oil from the sorbent material, wherein an average residence time for solids in the desorption zone is from 10 seconds to 5 minutes and wherein a dilute phase in the thermal desorption zone at exit therefrom has a temperature of at least about 200° C.;
(c) separating the peptizate-combustion effluent gas mixture into the dilute phase and a dense phase, wherein the dilute phase comprises oil vapor and whereby the dense phase has an oil content less than or equal to about 3 wt %;
(d) contacting the dilute phase with a first heat exchanger at a temperature above 100° C. to produce a first recovered fraction comprising at least 50 wt % of the oil in the substrate;
(e) recovering at least a portion of the oil present in first recovered fraction; and
(f) purifying at least a portion of the recovered oil by a purification process comprising contacting at least a portion of the recovered oil with a treatment solution, with an absorbent, with one or more reagents, separating, filtering, or a combination thereof, to produce a reclaimed oil having a total BTEX concentration of less than 1 wt %, determined according to ASTM D-5790 or an equivalent thereof.

E2. The method according to embodiment E1, wherein the purification process comprises contacting the recovered oil with at least one treatment solution comprising an acid, a base, a salt, or a combination thereof, followed by separating the oil from the treatment solution.

E3. The method according to embodiment E1 or E2, wherein the purification process comprises contacting the recovered oil with at least one treatment solution comprising concentrated sulfuric acid followed by separating the oil from the treatment solution.

E4. The method according to any one of embodiments E1 through E3, wherein the purification process comprises contacting the recovered oil with an absorbent selected from the group consisting of activated carbon, zeolites, alumina, silica, an aluminosilicate, a phyllosilicate, a titanate, wood powder, a bleaching earth clay, an anion exchange resin, a cation exchange resin, or a combination thereof, under conditions sufficient to remove at least a portion of an impurity from the recovered oil.

E5. The method according to embodiment E4, wherein the purification process further comprises separating the absorbent from the recovered oil, regenerating the absorbent to remove the impurities absorbed thereby, and recycling the regenerated absorbent back into the purification process.

E6. The method according to any one of embodiments E1 through E5, wherein the purification process comprises contacting the recovered oil with an amount of activated carbon at a temperature, and for a period of time sufficient to reduce the color of the recovered oil by at least 0.5 Saybolt color units, determined according to ASTM D156 or an equivalent thereof.

E7. The method according to any one of embodiments E1 through E6, wherein the purification process comprises contacting the recovered oil with a reagent selected from the group consisting of concentrated sulfuric acid, hydrogen, ozone, a peroxide, an amine, a group 3-12 transition metal compound, a group 3-12 transition metal salt, or a combination thereof.

E8. A fluid comprising a reclaimed oil recovered by thermal desorption from a peptized substrate comprising less than about 35 wt % of an oil or a mixture of oil and water bound on a solid sorbent material, the reclaimed oil having a total BTEX concentration of less than 1 wt %, determined according to ASTM D-5790 or an equivalent thereof.

E9. The fluid according to embodiment E8, wherein the reclaimed oil comprises greater than or equal to about 45 wt % long chain methylene $CH_2$ protons having a $^1H$ NMR chemical shift greater than or equal to about 1.00 to 1.50 ppm relative to trimethylsilane in $CDCl_3$, based on the total number of protons present, and less than or equal to about 12 wt % $CH_2/CH$ protons beta to an aromatic carbon having a $^1H$ NMR chemical shift from greater than 1.50 to about 2.00 ppm relative to trimethylsilane in $CDCl_3$, based on the total number of protons present.

E10. The fluid according to embodiment E8 or E9, wherein the reclaimed oil further comprises greater than or equal to about 3.5 wt % aromatic protons having a $^1H$ NMR chemical shift of greater than or equal to about 6.50 to about 8.50 ppm relative to trimethylsilane in $CDCl_3$, based on the total number of protons present.

E11. The fluid according to any one of embodiments E8 through E10, wherein the reclaimed oil further comprises greater than or equal to about 1 wt % poly-nuclear aromatic protons having a $^1H$ NMR chemical shift of greater than or equal to about 7.50 to about 9.00 ppm relative to trimethylsilane in $CDCl_3$, based on the total number of protons present.

E12. The fluid according to any one of embodiments E8 through E11, wherein the reclaimed oil further comprises less than or equal to about 0.4 wt % aromatic protons having a $^1H$ NMR chemical shift of greater than or equal to about 4.50 to about 6.00 ppm relative to trimethylsilane in $CDCl_3$, based on the total number of protons present.

E13. The fluid according to any one of embodiments E8 through E12, wherein the reclaimed oil further comprises less than or equal to about 0.5 wt % ether protons having a $^1H$ NMR chemical shift of greater than or equal to about 3.50 to about 4.00 ppm relative to trimethylsilane in $CDCl_3$, based on the total number of protons present.

E14. The fluid according to any one of embodiments E8 through E13, wherein the reclaimed oil further comprises less than or equal to about 0.9 wt % protons alpha to an aromatic carbon having a $^1H$ NMR chemical shift of greater than or equal to about 2.00 to about 3.50 ppm relative to trimethylsilane in $CDCl_3$, based on the total number of protons present.

E15. The fluid according to any one of embodiments E8 through E14, wherein the reclaimed oil has an initial boiling point of greater than or equal to about 170° C. and an end boiling point of greater than about 350° C., wherein the initial boiling point and the end boiling point are determined according to ASTM D86 or an equivalent thereof.

E16. The fluid according to any one of embodiments E8 through E15, wherein the reclaimed oil has a kinematic viscosity at 20° C. of less than or equal to about 5 cSt, a kinematic viscosity at 40° C. of less than or equal to about 3 cSt, or a combination thereof, wherein the kinematic viscosity is determined according to ASTM D445 or an equivalent thereof.

E17. The fluid according to any one of embodiments E8 through E16, wherein the reclaimed oil comprises greater than or equal to about 5 ppm by weight of organically bound nitrogen, determined according to ASTM D4629 or an equivalent thereof.

E18. The fluid according to any one of embodiments E8 through E17, wherein the reclaimed oil comprises greater than or equal to about 100 ppm of total sulfur by weight, determined according to ASTM D5453 or an equivalent thereof.

E19. The fluid according to any one of embodiments E8 through E18, comprising a water-in-oil emulsion comprising a surfactant system, an aqueous phase, and about 50 wt % to about 95 wt % of the reclaimed oil, wherein the water-in-oil emulsion has an electrical stability of greater than 1000V when determined according to API 13B-2, or an equivalent thereof.

E20. The fluid according to embodiment E19, wherein the water-in-oil emulsion has an electrical stability determined according to API 13B-2, or an equivalent thereof, which is at least 100V greater than an identically determined electrical stability of an essentially identical water-in-oil emulsion in which the reclaimed oil is replaced with diesel fuel.

E21. The fluid according to any one of embodiments E8 through E20, wherein the reclaimed oil is obtained by a method comprising:
(a) peptizing an acid-reactive substrate at a temperature between about 70° C. and about 105° C. with an acidic reagent under shear to obtain a peptizate having increased surface area, wherein the substrate comprises liquid bound on a solid sorbent material, wherein the liquid comprises oil or a mixture of oil and water, wherein the bound liquid comprises less than about 35 wt % of the substrate;
(b) cocurrently mixing the peptizate with a combustion effluent gas under turbulent conditions in a thermal desorption zone to heat the peptizate and desorb at least a portion of the oil from the sorbent material, wherein an average residence time for solids in the desorption zone is from 10 seconds to 5 minutes and wherein a dilute phase in the thermal desorption zone at exit therefrom has a temperature of at least about 200° C.;
(c) separating the peptizate-combustion effluent gas mixture into the dilute phase and a dense phase, wherein the dilute phase comprises oil vapor and whereby the dense phase has an oil content less than or equal to about 3 wt %;
(d) contacting the dilute phase with a first heat exchanger at a temperature above 100° C. to produce a first recovered fraction comprising at least 50 wt % of the oil in the substrate;
(e) recovering at least a portion of the oil present in first recovered fraction; and
(f) purifying at least a portion of the recovered oil by a purification process comprising contacting at least a portion of the recovered oil with a treatment solution, with an absorbent, with one or more reagents, separating, filtering, or a combination thereof, to produce the reclaimed oil having a total BTEX concentration of less than 1 wt %, determined according to ASTM D-5790 or an equivalent thereof.

E22. The fluid according to any one of embodiments E8 through E21, wherein the reclaimed oil is obtained by a method according to any one of embodiments E1 through E7.

EXAMPLES

A test was conducted on a commercial scale unit using OBDC obtained from a well site wherein diesel fuel was utilized in the drilling fluid. The initial BTEX content in the diesel fuel was 32,000 ppm. Oil was physically removed from a sample of the OBDC and analyzed as a comparative example. The BTEX content of the liquid present in the OBDC was 6,000 ppm. The OBDC was treated and the oil recovered according to the instant disclosure. The average residence time of the solids was 40 seconds in the peptizer and 3 minutes in the thermal desorber. The peptizing zone volume was 1.8 m$^3$ and the thermal desorption zone volume was 22.8 m$^3$.

The OBDC (the "substrate") was supplied to the peptizer along with concentrated sulfuric acid at an average of 3.7 wt % by weight of the OBDC. The peptizer outlet temperature was between 80° C. and 100° C. The peptizate was fed into the desorber co-currently with a combustion effluent gas supplied at a temperature of ~1000° C. The temperature at the outlets of the thermal desorption zone was maintained between 240° C. and 260° C. by adjusting the acid rate to the peptizer as needed. The dense phase solids were recovered through a rotary valve. The dilute phase exited the thermal desorption zone and entered a cyclone separator and entrained solids were recovered. The solids-lean vapor phase exited the cyclone separator at a temperature between 150° C. and 180° C., and entered a knock-out drum to further remove entrained solids. The gas exited the knock-out drum at a temperature of 120° C. to 140° C., and was directed into a first high-temperature heat exchanger maintained at a temperature between about 105° C. and 120° C., wherein oil and some entrained water were recovered. The remainder of the dilute vapor phase comprising uncondensed vapors exited the first high-temperature heat exchanger at a temperature between 40° C. and 60° C. and were then directed into a second low temperature condenser using cooling tower water maintained at a temperature of about 30° C. as the cooling medium. A mixture of oil and water were recovered. The condensate from the second low temperature condenser was gravity separated to recover the oil. The uncondensed vapors were directed to a scrubber column at a temperature between 33° C. and 35° C. and were vented to the atmosphere. The feed materials and the recovered oils were then characterized prior to any additional purification. The data are in Table 1.

As the data show, the recovered oil from the first high-temperature condenser is significantly lower in BTEX compared to the oil present in the OBDC and the oil recovered from the low temperature condenser.

The distillation curves of the comparative examples and the inventive examples were then determined. The data are shown graphically in FIG. 14 and summarized in Tables 2 and 3, respectively.

TABLE 2

| Source of Sample | Fraction | Temp. Range (° C.) | wt % Distillation |
|---|---|---|---|
| Diesel (comparative) | 1 | 204-220 | 20.4 |
| | 2 | 224-236 | 20.8 |
| | 3 | 242-274 | 34.6 |
| | 4 | 280-314 | 11.0 |
| | Residual | | 13.2 |
| | Solids | | 0 |
| OBDC (comparative) | 1 | 186-306 | 18.7 |
| | 2 | 310-328 | 41.0 |
| | 3 | 340-374 | 16.4 |
| | Residual | | 13.6 |
| | Solids | | 10.3 |

TABLE 3

| Source of Sample | Fraction | Temp. Range (° C.) | wt % Distillation |
|---|---|---|---|
| Inventive High Temp Cond. | 1 | 260-286 | 61.7 |
| | 2 | 296-350 | 27.0 |
| | Residual | | 11.3 |
| Inventive Low Temp Cond. | 1 | 230-286 | 55.2 |
| | 2 | 300-358 | 33.5 |
| | Residual | | 11.3 |

As the data show, the inventive oil recovered from the high temperature condenser has a reduced amount of lighter hydrocarbons, and a significant reduction in BETX.

Oil Purification

The oil recovered from the high temperature condenser was subsequently purified by treating the oil with concentrated sulfuric acid. Concentrated sulfuric acid (i.e., 98 wt % $H_2SO_4$) was added to the oil in an amount equal to 2 wt % of the oil present. The mixture was agitated at ambient temperature (~25° C.) for about an hour and then allowed to phase separate for about 3 hours. The treated oil was decanted, revealing a sludge thought to comprise asphaltenes, waxes, and other heavy components, which were subsequently discarded. The acid treated oil was then contacted with activated charcoal via plug flow through an activated charcoal bed. The color was reduced from an essentially black, opaque solution (Saybolt Color <50) to a clear amber solution having a Saybolt color of about –30. The purified oil was then directed through a polishing filter via vacuum filtration to produce the final product reclaimed oil.

Reclaimed Oil Characterization

A sample of the inventive reclaimed oil was analyzed according to industry standards and compared to a compara-

TABLE 1

| Sample | Viscosity (cp) | Density (g/cm$^3$) | FLASH POINT (° C.) | Boiling Point (° C.) | API Gravity | *BTEX (ppm) (% Reduction) | **Aniline Point (° C.) | % solids (wt %) |
|---|---|---|---|---|---|---|---|---|
| Diesel (comparative) | 6 | 0.8200 | <70 | 130 | ND | 32,000 | 67 | 0.00 |
| Oil of Cuttings (OBDC) (comparative) | 22 | 0.8630 | 140 | 160 | 31.5 | 6,000 | 67 | 12.00 |
| High Temp Cond. | 10 | 0.8373 | 110 | 180 | 37 | 800 (86.6%) | 70 | 1.80 |
| Low Temp. Cond. | 8 | 0.8295 | 94 | 230 | 37 | 3800 (36.6%) | 62 | 1.64 |

*BTEX GC-MS ASTM D-5790-95(2006).
**Aniline point—ASTM D611 tive paraffinic naphthenic solvent, LPA-210 (Sasol, North America, Houston, Tex.), which is an industry standard utilized in high temperature drilling fluids. The data are shown in Table 4.

TABLE 4

| Analysis | Comparative LPA ® 210 Solvent | Reclaimed Oil Example |
|---|---|---|
| Initial Boiling Point ° C. ASTM D 86 | 240 | 173 |
| 10% recovered ° C. | 242 | 206 |
| 90% recovered, ° C. | 258 | 326 |
| 95% recovered, ° C. | 266 | 347 |
| End Point, ° C. | 280 | 406 |
| Flash Point Pensky-Martens Closed Cup, ° C., ASTM D 93 | 107 | 99.4 |
| Freezing Point of Aviation Fuels, "C, ASTM D 2386 | <−68 | −35.6 |
| Pour Point of Petroleum Oils, "C, ASTM D 97 | <−58 | −35.6 |
| Specific Gravity @ 15° C. ASTM D 287 | 0.826 | 0.8443 |
| Density @20° C., lbs/gal, ASTM D 287 | 6.89 | 7.04 |
| Average Molecular Weight, API | 193 | 207 |
| Color, Saybolt Chromometer Method, ASTM D 156 | +30 | −30 |
| Relative Evaporation Rate (n-Butyl Acetate = 1), ASTM D3539 | 0.004 | 0.007 |
| Vapor Pressure, torr @ 20° C., API, calc | 0.02 | 0.45 |
| Viscosity, Kinematic, at 20° C., cSt, ASTM D 445 | 4.1 | 4.71 |
| Viscosity, Kinematic, at 40° C., cSt, ASTM D 445 | 2.6 | 2.98 |
| Aniline Point of Petroleum Products, "C ASTM D 611 | 79.4 | 69.4 |
| Kauri-Butanol Value of Hydrocarbon Solvents, ASTM D 1133 | 29 | 30 |
| Solubility parameters, $\delta$/MPa$^{1/2}$, Calculated | 15.8 | Insoluble |
| Bromine Number by Electrometric Titration Method, ASTM D 1159 | <0.2 | <1.0 |
| Nitrogen, Organically Bound, by Chemiluminescence, ppm, ASTM D 4629 | <1 | 5.4 |
| Total Sulfur in Light Hydrocarbons by UV Fluorescence, ppm, ASTM D 5453 | <1 | 147 |
| Water Content by Volumetric Karl Fischer Method, wt %, ASTM E 203 | <50 | 0.007 |
| Aromatics-BTEX ppm ASTM D 5790 | ND* | |
| Benzene | | <20.0 ppm |
| Toluene | | 22.4 ppm |
| Ethylbenzene | | 23.9 ppm |
| m&p-Xylene | | 35.6 ppm |
| o-Xylene | | 21.5 ppm |

Reclaimed Oil Characterization—NMR Analysis

The $^1$H and $^{13}$C NMR spectra of the reclaimed oil according to an embodiment of the instant disclosure, and of comparative diesel fuel were measured. The data were acquired using a Varian Mercury MVX300 NMR spectrometer operating at 7.05 T, and a 5 mm Varian ATB broad band probe. The resonance frequency for $^1$H was 299.67 MHz. The $^1$H experiments were obtained with an 8 kHz spectral width, with 28.4 K points being acquired in an acquisition time of 3.554 seconds. The spectrum was zero-filled to 131 K points before Fourier transformation. A 5 second relaxation delay was used and a 45 degree tip angle of 8 µs on the pulse with a total of 32 pulses signal averaged on about 20 mg of sample dissolved in a 5 mm NMR tube (Wilmad) in CDCl3 which contained 0.05 v/v tetramethylsilane (TMS) as the chemical shift reference (solvent obtained from Cambridge Isotopes Laboratories, Andover Mass.). The $^{13}$C spectra were acquired at a resonance frequency of 75.36 MHz with a 25K spectral width, a 0.6384 second acquisition time and a 1 second relaxation time with 3072 scans being signal averaged. The $^{13}$C samples were dissolved in CDCl$_3$ containing 0.025M CrAcAc relaxation agent and the experiments were obtained using inverse gated proton decoupling to remove NOE enhancement and allow quantitative measurement of the carbon types.

Figure 15:
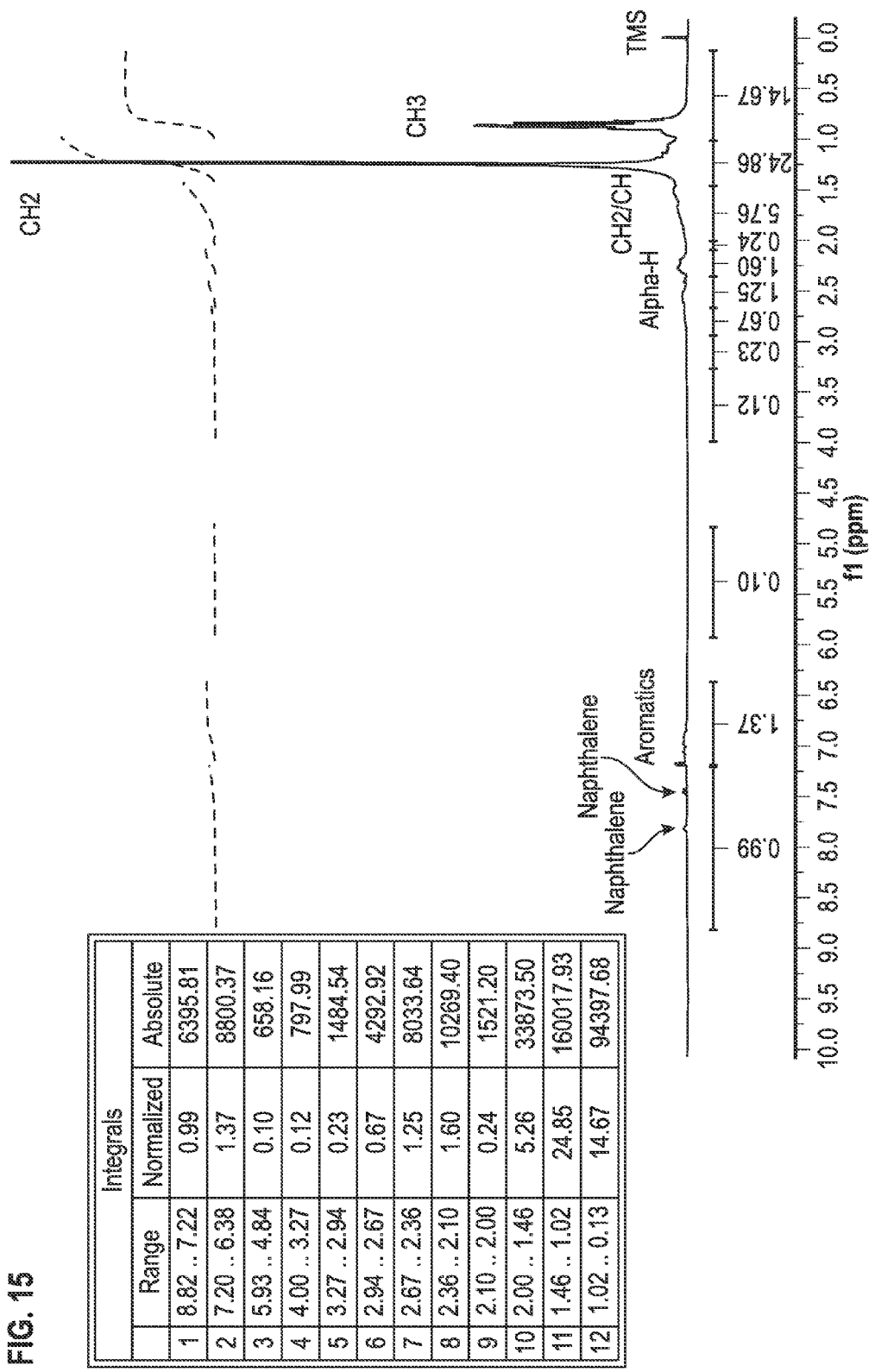
FIG. 15 is a $^1$H NMR spectrum of a reclaimed oil according to an embodiment.
Figure 16:
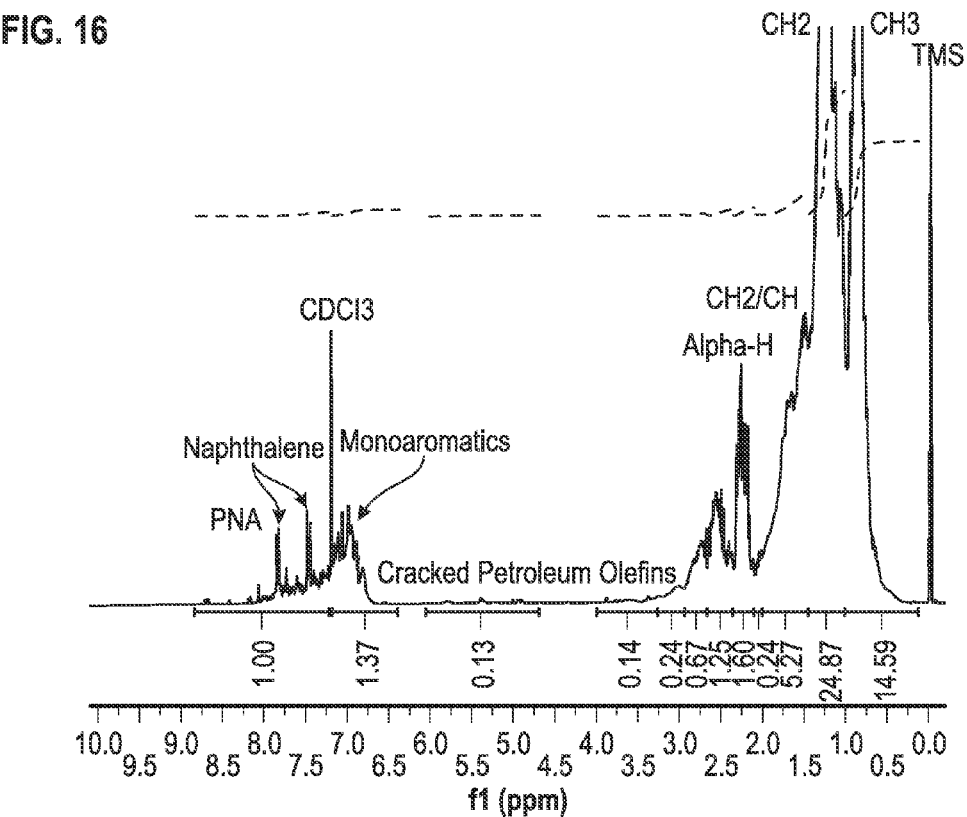
FIG. 16 is a magnified view of a portion of the $^1$H NMR spectrum shown in FIG. 15.
Figure 17:
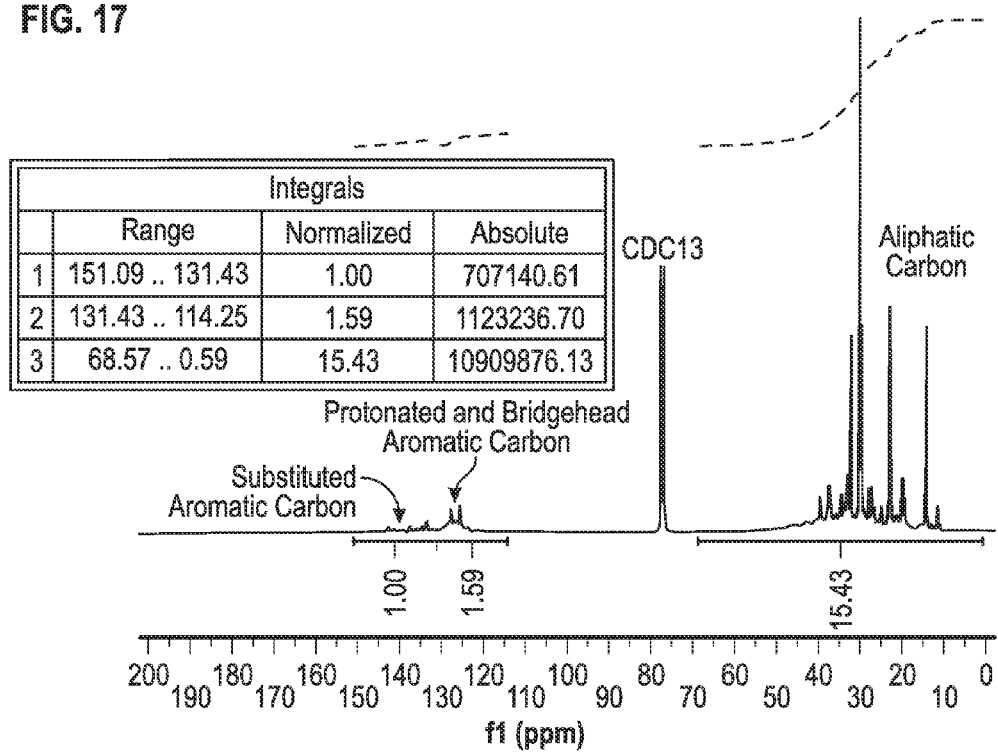
FIG. 17 is a $^{13}$C NMR spectrum of a reclaimed oil according to an embodiment.
Figure 18:
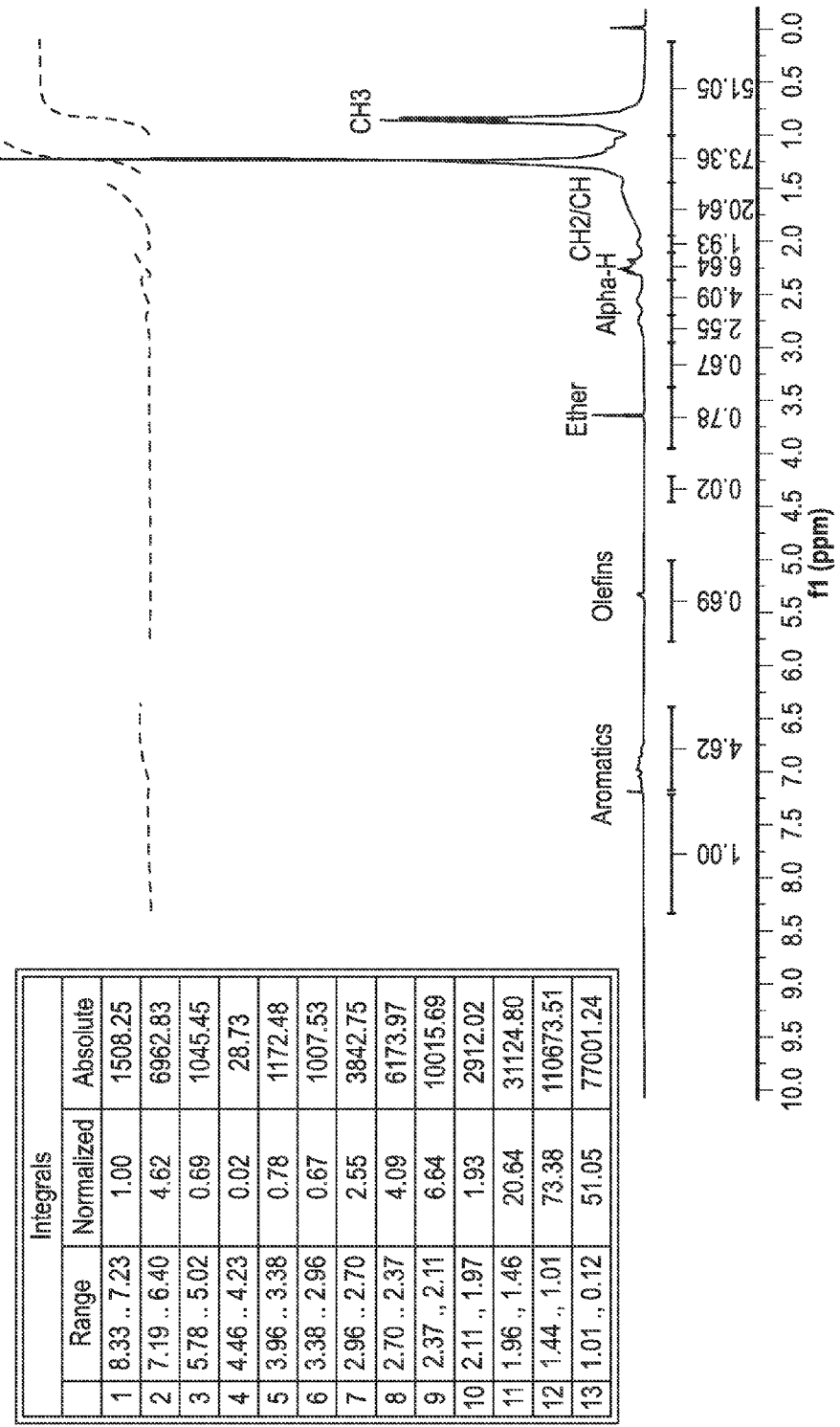
FIG. 18 is a $^1$H NMR spectrum of a comparative diesel.
Figure 19:
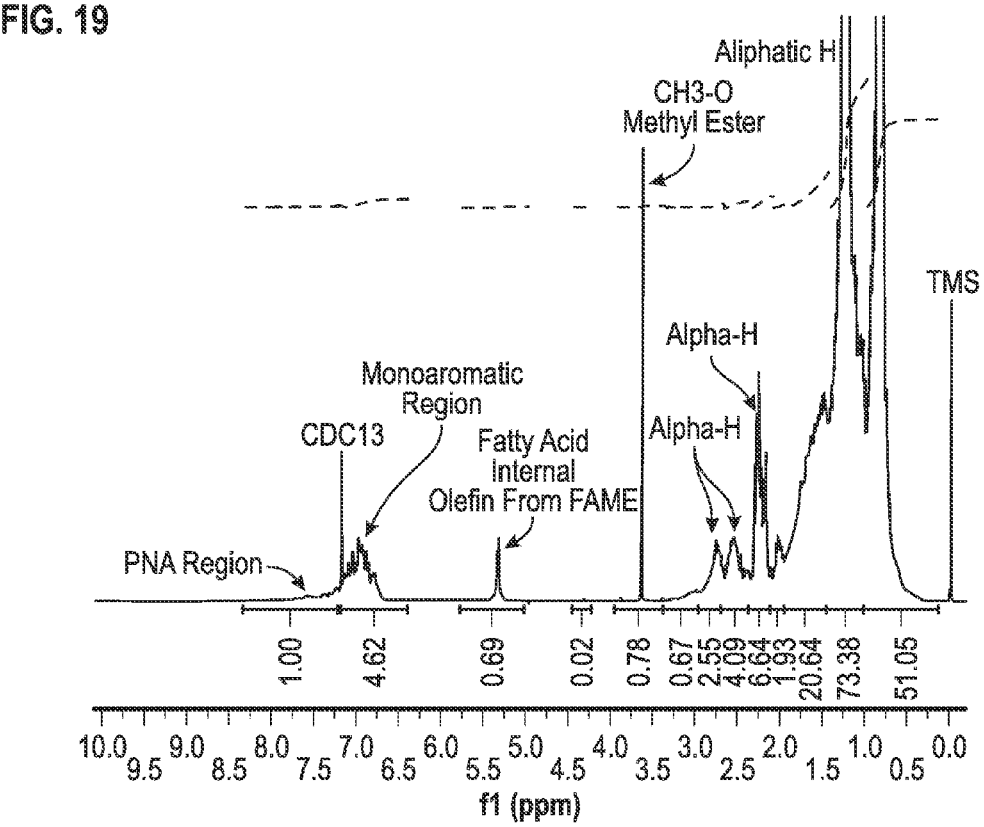
FIG. 19 is a magnified view of a portion of the $^1$H NMR spectrum shown in FIG. 18.
Figure 20:
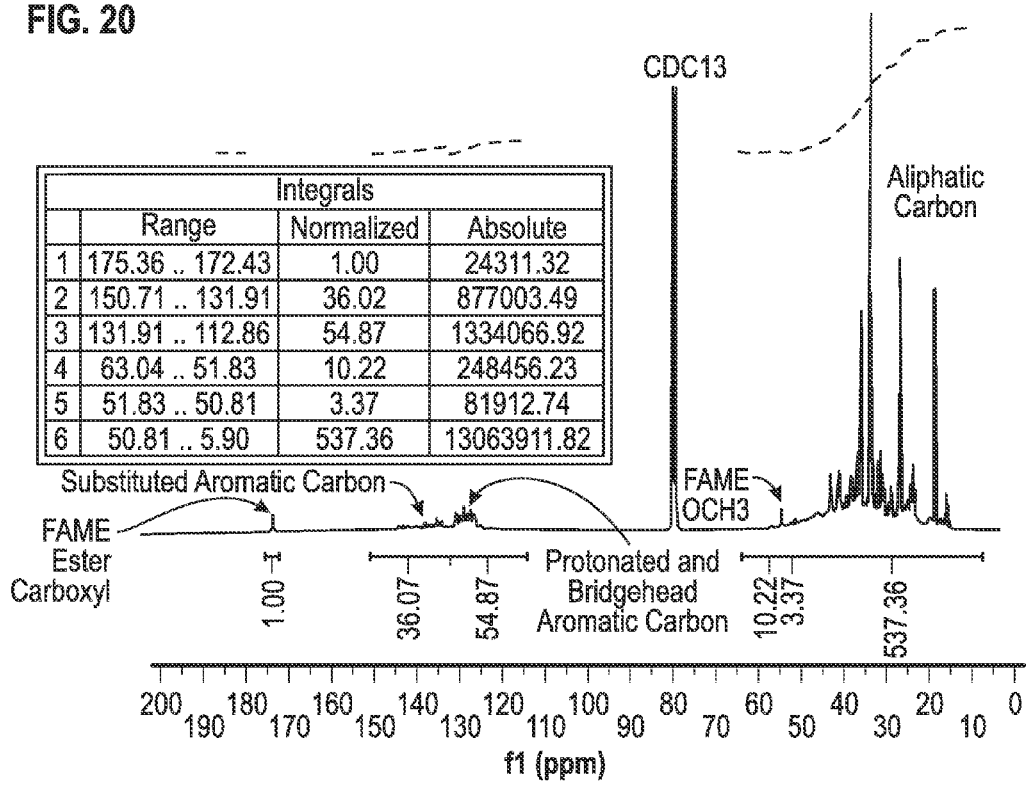
FIG. 20 is an $^{13}$C NMR spectrum of a comparative diesel.

The full scale $^1$H spectrum of the inventive example of reclaimed oil is shown in FIG. 15, an enlarged spectrum of a portion of FIG. 15 is shown in FIG. 16. A full scale $^{13}$C spectrum of the inventive example of reclaimed oil is shown in FIG. 17. These data were compared to identically obtained NMR spectra of diesel fuel in which a full scale $^1$H spectrum of the comparative diesel fuel is shown in FIG. 18, an enlarged spectrum of a portion of FIG. 18 is shown in FIG. 19, and a full scale $^{13}$C spectrum of the comparative example is shown in FIG. 20.

Table 5 discloses the $^1$H NMR "proton type" analysis and the % $^1$H (protons) of each carbon type present in the sample, based on normalized integrals of the total amount of $^1$H present. Table 6 shows the $^{13}$C NMR "carbon-type" analysis—% C (carbons) of each carbon type present in the sample, based on normalized integrals of the total amount of C present.

As the data show, a significant difference in the chemistry is observed between the inventive reclaimed oil and the comparative diesel fuel with respect to the concentration of naphthalene type compounds. The inventive example contains naphthalene at an easily observable concentration (observed in the polynuclear aromatic region of the 'H NMR spectrum (7.2-8.5 ppm)), the comparative example being essentially void of naphthalene. Another significant difference between the inventive reclaimed oil and the comparative diesel fuel is the increased presence of long-chain CH$_2$ protons in the inventive oil. One of skill in the art readily understands that this increased aliphatic content in the Example according to an embodiment of the instant disclosure results in significant improvements in emulsion stability with respect to temperature and attack by acidic compounds.

TABLE 5

| | $^1$H NMR | |
|---|---|---|
| | Example (wt % protons) | Comparative diesel fuel (wt % protons) |
| Aliphatic protons | 95.2 | 95.8 |
| Aromatic protons | 4.6 | 3.3 |
| Polynuclear aromatic protons | 1.9 | 0.6 |
| Naphthalene protons | 0.3 | 0.0 |
| Monoaromatic protons | 2.7 | 2.7 |
| Olefinic protons | 0.2 | 0.4 |
| Methoxy protons (fatty acid methyl esters) | 0.0 | 0.5 |
| Protons alpha to aromatic carbons | 8.0 | 9.4 |
| Protons beta to aromatic carbons (CH$_2$/CH) | 10.2 | 12.3 |
| Long chain CH$_2$ protons | 48.4 | 43.7 |
| CH$_3$ protons | 28.6 | 30.4 |

TABLE 6

$^{13}$C NMR

| | Example (wt % carbons) | Comparative Diesel fuel (wt % carbons) |
|---|---|---|
| Aliphatic carbons | 85.6 | 85.7 |
| Aromatic carbons | 14.4 | 14.1 |
| Carboxyl carbons | 0.0 | 0.2 |
| Substituted Aromatic carbons | 5.6 | 5.6 |
| Monoaromatic and Polynuclear aromatic carbons | 8.8 | 8.5 |
| Ethereal carbons | 0.0 | 0.2 |

A small amount of cracked petroleum product is present giving rise to olefin signals in the 4.7-6 ppm region of the spectrum. In contrast, the comparative diesel fuel sample showed the presence of fatty acid-methyl esters (FAME) characteristic of biodiesel in a petroleum based diesel product. Methyl ester ether and fatty acid olefins were observed in the $^1$H NMR spectrum and the ester carboxyl and the methoxy carbon were observed in the $^{13}$C NMR spectrum, which are readily known to one of skill in the art to diminish emulsion stability in drilling fluids at relatively high temperatures.

As is known to one of skill in the art, the presence of higher aromatic, polynuclear aromatic, and naphthalenic compounds improves the high temperature stability of water-in-oil emulsion based drilling fluids. Likewise, improved stability is typically found in the absence of olefinic compounds. Another significant indication of the high temperature stability of the instant reclaimed oil is the increased presence of long chain CH$_2$ protons as compared to diesel fuel. This data is also consistent with the ability of the inventive oil to form emulsions having improved acid resistance compared to diesel fuel and other oils used in drilling fluids.

Reclaimed Oil Characterization—GC-MS Analysis

Figure 21:
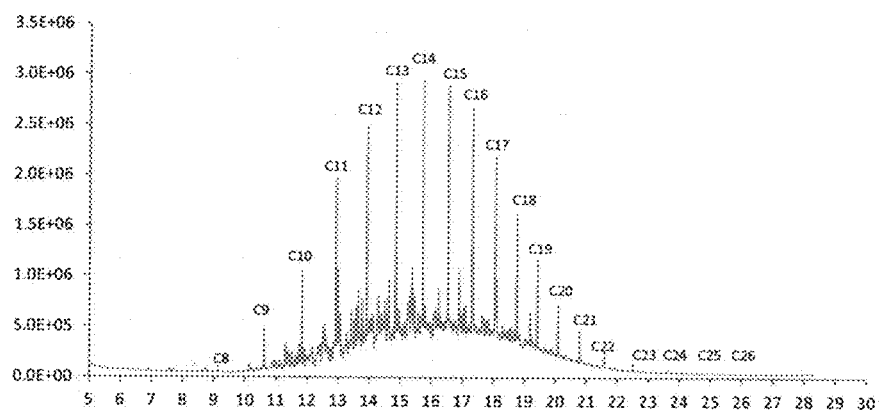
FIG. 21 is a GC chromatogram of a reclaimed oil according to an embodiment.
Figure 22:
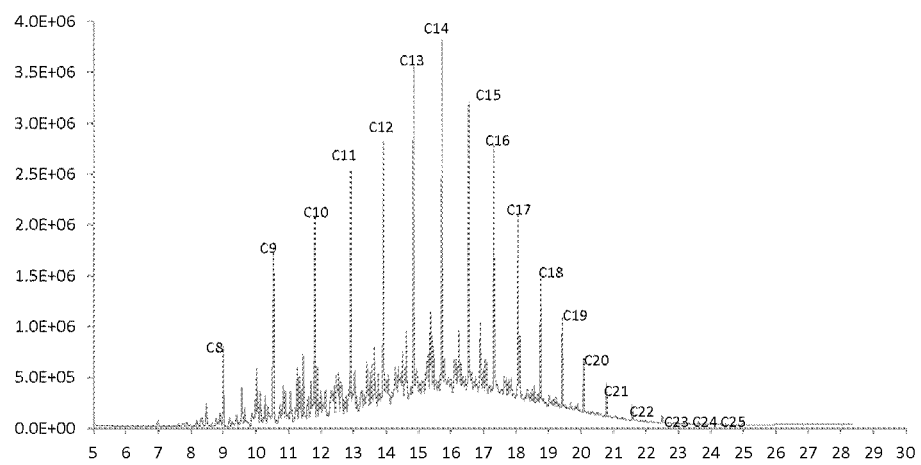
FIG. 22 is a GC chromatogram of a comparative diesel.
Figure 23:
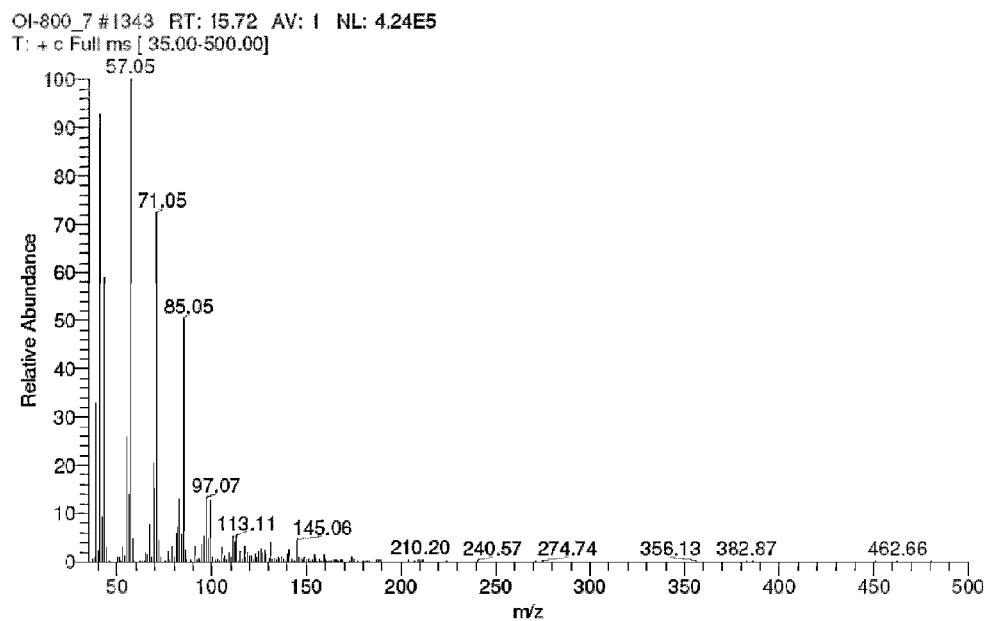
FIG. 23 is a mass spectrum of the peak at retention time 15.72 of the chromatogram of the reclaimed oil shown in FIG. 20.
Figure 24:
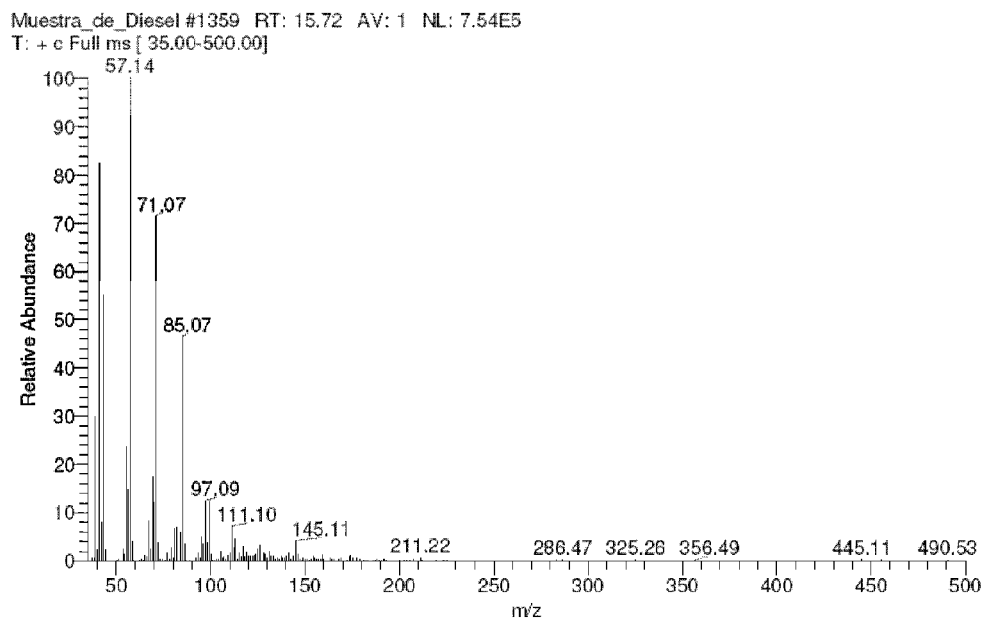
FIG. 24 is a mass spectrum of the peak at retention time 15.72 of the chromatogram of the comparative oil shown in FIG. 21.
Figure 25:
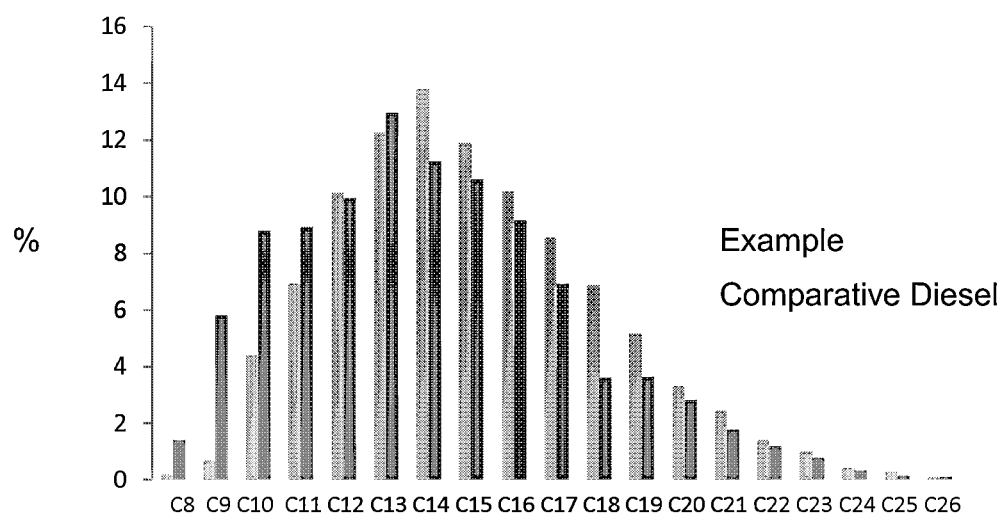
FIG. 25 is a bar graph showing the normalized percentages of components present in the reclaimed oil according to an embodiment in direct comparison to the components present in the comparative diesel fuel.

A sample of the reclaimed oil according to the instant disclosure was analyzed via gas chromatography and the mass spectrum of various components measured. A comparative analysis was also conducted utilizing diesel fuel. The analysis was conducted using a 2 ml aliquot of the sample diluted in 50 mls methylene chloride, which was subsequently diluted 10:1 for analysis. A DB-1 column was utilized via 1 μl split less injection at 250° C. The temperature was maintained at 40° C. for 4 minutes and then increased at 15° C./min to a final temperature of 270° C. which was held for 9 minutes. The chromatogram of the inventive example is shown in FIG. 21 and a chromatograph of the comparative diesel example is shown in FIG. 22. A representative EI+ mass spectrum of the C14 peak at retention time 15.72 for the inventive sample is shown in FIG. 23, and a corresponding mass spectrum of the peak at retention time 15.72 for the comparative diesel sample is shown in FIG. 24. A direct comparison of the normalized data in bar graph format of the inventive example and the comparative example is shown in FIG. 25. The normalized data shown in FIG. 25 are presented in Table 7.

TABLE 7

| Retention | | Sample | | Comparative Diesel Fuel | |
|---|---|---|---|---|---|
| Time min. | Carbon Number | AREA | Percentage (area %) | AREA | Percentage (area %) |
| 9.00 | C8 | 454142 | 0.187 | 7004352 | 1.380 |
| 10.55 | C9 | 1653771 | 0.680 | 29385750 | 5.739 |
| 11.81 | C10 | 10721818 | 4.406 | 44647492 | 8.796 |
| 12.92 | C11 | 16882404 | 6.937 | 45253747 | 8.916 |
| 13.92 | C12 | 24692976 | 10.147 | 50472763 | 9.944 |
| 14.86 | C13 | 29872795 | 12.275 | 65748909 | 12.953 |
| 15.72 | C14 | 33597083 | 13.806 | 57022654 | 11.234 |
| 16.55 | C15 | 28984503 | 11.910 | 53780296 | 10.595 |
| 17.33 | C16 | 24804966 | 10.193 | 46487189 | 9.159 |
| 18.07 | C17 | 20852635 | 8.569 | 35038968 | 6.903 |
| 18.77 | C18 | 16718072 | 6.370 | 1B272419 | 3.600 |
| 19.44 | C19 | 12497577 | 5.135 | 133B4000 | 3.622 |
| 20.09 | C20 | 8025032 | 3.298 | 14330386 | 2.823 |
| 20.80 | C21 | 5935910 | 2.439 | 8975708 | 1.768 |
| 21.59 | C22 | 3402377 | 1.398 | 5971490 | 1.176 |
| 22.51 | C23 | 2409347 | 0.990 | 3954506 | 0.779 |
| 23.61 | C24 | 1024851 | 0.421 | 1651669 | 0.325 |
| 24.98 | C25 | 657710 | 0.270 | 697101 | 0.137 |
| 26.67 | C26 | 171388 | 0.070 | 501547 | 0.099 |
| TOTAL | | 243359357 | 100 | 507580958 | 100 |

Accordingly, the data show that the reclaimed oil according to the instant disclosure possess improved properties over diesel fuel and other comparative oils utilized in drilling fluids. In particular, the inventive reclaimed oil possesses an improved emulsion stability, especially at higher temperatures, high pressure, and in the presence of corrosive gases, all of which are conditions typically found in relatively deep well environments which utilize water-in-oil emulsion based drilling fluids.

The lab results were validated using gel testing according to methods known in the art. The exemplary oil produced according to an embodiment of the instant disclosure produced a better gel having improved characteristics compared to an essentially identical gel produced using diesel fuel. Accordingly, the reclaimed oils according to the instant disclosure represent an improvement in emulsion stability under a variety of conditions relative to oils known in the art.

Formulation Testing

Two drilling fluid formulations were prepared for evaluation; an exemplary formulation using the reclaimed oil according to the instant disclosure, and a comparative formulation utilizing diesel fuel in place of the reclaimed oil.

The components of the test formulations are listed in Table 8. The formulation was prepared according to common practices readily known to one having minimal skill in the art to produce a water-in-oil emulsion drilling fluid having a density of 1.40 g/cm$^3$ (11.7 lbs/gal).

The formulations were then characterized according to industry standards and practices. The data are shown in Table 9.

TABLE 8

| Component | Description | Amount (g) | PPB |
|---|---|---|---|
| Water | DI-Water | 173 g | 60.7 |
| Oil Base | Sample purified product reclaimed oil or Comparative Diesel fuel | 614 g | 215.4 |
| *SAFEVERT ® I | primary invert emulsifier & high temperature stabilizer | 14 | 4.9 |
| *SAFEVERT ® II | invert emulsifier and wetting agent | 16 | 5.6 |

TABLE 8-continued

| Component | Description | Amount (g) | PPB |
|---|---|---|---|
| CaOH | Lab stock | 30 | 12.9 |
| CaCl$_2$ | Lab stock | 30 | 10.53 |
| *SAFEVERT ® INVERT VISCOSIFIER. STANDARD | Bentonite based organophilic clay for viscosity control in invert systems | 16 | 5.61 |
| *SAFEVERT ® FLG | finely ground chemically modified gilsonite efficiently control fluid loss control agent | 20 | 7.02 |
| Barite | weighting agent | 525 | 184.21 |

*SAFEVERT is a registered trademark of Integrity industries, Kingsville, TX. USA)

As the data show, the formulation utilizing the inventive reclaimed oil achieved improved emulsion stability with a value of 1,850 volts, which are much higher than the comparative formulations. Indeed, the strong emulsion stability exemplified by the inventive formulation is essentially unknown in the oilfield without highly increasing the concentration of emulsifiers and other additives, which in-turn results in properties detrimental to other aspects of such formulations. The above exemplary formulation is extremely stable, and demonstrates high CO$_2$ and others acidic gas well intrusions, as well as fresh or salt water inflows, as demonstrated by both the stability and the HPHT filtrate data of the inventive formulation.

As the data also show, formulations which utilize the inventive reclaimed oil possess a density and viscosity profile suitable for thixotropic applications. The data also demonstrate the improved gels structure, which is an issue related to containing gassing and pressure when the fluid is static in a well application.

TABLE 9

| | Example Formulation | Comparative Diesel Fuel Example |
|---|---|---|
| (Mw) DENSITY, ρ (ppg) | 11.7 | 11.7 |
| Apparent Viscosity (cP) | 35 | 33 |
| Plastic Viscosity (cP) | 26 | 24 |
| Yield Point (lb/100 ft2) | 18 | 17 |
| Gel 10"/10' (lb/100 ft$_2$) | 14/27 | 22/30 |
| High Pressure High Temperature Filtrate (cc) 350° F./ΔP500 psi | 3.7 OIL ONLY | 3.6 OIL ONLY |
| Alkalinity ml(H$_2$SO$_4$) | 7.2 | 7.9 |
| Exess Lime (ppb) | 9.3 ppb | 10.23 ppb |
| Chlorides(ppm) | 180,327 | 180,959 |
| % Solids | 13 | 14 |
| % Oil | 70 | 69 |
| % Water | 17 | 17 |
| OWR (RATIO) | 80/20 | 80/20 |
| Emulsion Stability (volts) | 1850 | 934 |
| AgNO3 (cc) | 2.39 | 2.4 |
| L600 (cP) | 70 | 65 |
| L300 (cP) | 44 | 41 |
| L200 (cP) | 33 | 31 |
| L100 (cP) | 21 | 22 |
| L6 (cP) | 11 | 12 |
| L3 (cP) | 9 | 10 |
| Filter Cake (1/32 inch) | 1 Flexible/Plastic | 1 Flexible/Plastic |

The invention has been described above with reference to numerous embodiments and specific examples. Many variations will suggest themselves to those skilled in this art in light of the above detailed description. All such obvious variations are within the full intended scope of the appended claims.

I claim:

1. A fluid comprising a water-in-oil emulsion having an electrical stability of greater than 1000V when determined according to API 13B-2, and comprising an aqueous phase and a reclaimed oil recovered by direct thermal desorption from a peptized substrate comprising a mixture of oil and water and a solid, acid-treated sorbent material, the reclaimed oil comprising:
   (a) a non-zero total BTEX concentration of less than 1 wt %, determined according to ASTM D-5790 or US EPA 8260;
   (b) an aniline point of greater than or equal to about 69° C. as determined by ASTM-D611;
   (c) a kinematic viscosity of equal to or greater than 2 cSt at 40° C. as determined according to ASTM-D445 or ASTM-D88;
   (d) a non-zero sulfur content;
   (e) a flash point of greater than or equal to about 100° C., as determined using the Pensky-Martens closed cup analysis according to ASTM D93;
   (f) a pour point of less than or equal to −15° C., as determined according to ASTM D-92;
   (g) a specific gravity of 0.82 or greater as determined according to ASTM-D1298 or ASTM-D287; and
   (h) a non-zero nitrogen content.

2. The fluid of claim 1, wherein the reclaimed oil comprises greater than or equal to about 45 wt % long chain methylene CH$_2$ protons having a $^1$H NMR chemical shift greater than or equal to about 1.00 to 1.50 ppm relative to trimethylsilane in CDCl$_3$, based on the total number of protons present, and less than or equal to about 12 wt % CH$_2$/CH protons beta to an aromatic carbon having a $^1$H NMR chemical shift from greater than 1.50 to about 2.00 ppm relative to trimethylsilane in CDCl$_3$, based on the total number of protons present.

3. The fluid of claim 1, wherein the reclaimed oil further comprises greater than or equal to about 3.5 wt % aromatic protons having a $^1$H NMR chemical shift of greater than or equal to about 6.50 to about 8.50 ppm relative to trimethylsilane in CDCl$_3$, based on the total number of protons present.

4. The fluid of claim 1, wherein the reclaimed oil further comprises:
   greater than or equal to about 1 wt % poly-nuclear aromatic protons having a $^1$H NMR chemical shift of greater than or equal to about 7.50 to about 9.00 ppm relative to trimethylsilane in CDCl$_3$, based on the total number of protons present;
   less than or equal to about 0.4 wt % aromatic protons having a $^1$H NMR chemical shift of greater than or equal to about 4.50 to about 6.00 ppm relative to trimethylsilane in CDCl$_3$, based on the total number of protons present; or
   a combination thereof.

5. The fluid of claim 1, wherein the reclaimed oil further comprises less than or equal to about 0.5 wt % ethereal protons having a $^1$H NMR chemical shift of greater than or equal to about 3.50 to about 4.00 ppm relative to trimethylsilane in CDCl$_3$, based on the total number of protons present.

6. The fluid of claim 1, wherein the reclaimed oil further comprises less than or equal to about 0.9 wt % protons located alpha to an aromatic carbon having a $^1$H NMR chemical shift of greater than or equal to about 2.00 to about 3.50 ppm relative to trimethylsilane in CDCl$_3$, based on the total number of protons present.

7. The fluid of claim 1, wherein the reclaimed oil has an initial boiling point of greater than or equal to about 170° C. and an end boiling point of greater than about 350° C., wherein the initial boiling point and the end boiling point are determined according to ASTM D86.

8. The fluid of claim 1, wherein the reclaimed oil has a kinematic viscosity at 20° C. of less than or equal to about 5 cSt, and a kinematic viscosity at 40 ° C. of less than or equal to about 3 cSt, wherein the kinematic viscosity is determined according to ASTM D445.

9. The fluid of claim 1, wherein the reclaimed oil comprises greater than or equal to about 5 ppm by weight of organically bound nitrogen, determined according to ASTM D4629.

10. The fluid of claim 1, wherein the reclaimed oil comprises greater than or equal to about 100 ppm of total sulfur by weight, determined according to ASTM D5453.

11. The fluid of claim 1, further comprising a surfactant system and about 50 wt % to about 95 wt % of the reclaimed oil.

12. The fluid of claim 11, wherein the reclaimed oil is obtained by a method comprising:
(a) peptizing an acid-reactive substrate at a temperature between about 70° C. and about 105° C. with an acidic reagent under shear to obtain a peptizate having increased surface area, wherein the substrate comprises liquid bound on a solid sorbent material, wherein the liquid comprises oil or a mixture of oil and water, wherein the bound liquid comprises less than about 35 wt % of the substrate;
(b) cocurrently mixing the peptizate with a combustion effluent gas under turbulent conditions in a thermal desorption zone to heat the peptizate and desorb at least a portion of the oil from the sorbent material, wherein an average residence time for solids in the desorption zone is from 10 seconds to 5 minutes and wherein a dilute phase in the thermal desorption zone at exit therefrom has a temperature of at least about 200° C.;
(c) separating the peptizate-combustion effluent gas mixture into the dilute phase and a dense phase, wherein the dilute phase comprises oil vapor and whereby the dense phase has an oil content less than or equal to about 3 wt %;
(d) condensing the dilute phase at a temperature above 100° C. to produce a first recovered fraction comprising at least 50 wt % of the oil in the substrate;
(e) recovering at least a portion of the oil present in first recovered fraction; and
(f) purifying at least a portion of the recovered oil by a purification process comprising contacting at least a portion of the recovered oil with a treatment solution, with an absorbent, with one or more reagents, separating, filtering, or a combination thereof, to produce a reclaimed oil having a total BTEX concentration of less than 1 wt %, determined according to US EPA Method SW846, including SW846-8260B or ASTM D-5790.

13. The fluid of claim 1, wherein the purification process comprises contacting the recovered oil with at least one treatment solution comprising an acid, a base, a salt, or a combination thereof, followed by separating the oil from the treatment solution.

14. The fluid of claim 1, wherein the purification process comprises contacting the recovered oil with at least one treatment solution comprising concentrated sulfuric acid followed by separating the oil from the treatment solution.

15. The fluid of claim 1, wherein the purification process comprises contacting the recovered oil with an absorbent selected from the group consisting of activated carbon, zeolites, alumina, silica, an aluminosilicate, a phyllosilicate, a titanate, wood powder, a bleaching earth clay, an anion exchange resin, a cation exchange resin, or a combination thereof, under conditions sufficient to remove at least a portion of an impurity from the recovered oil.

16. The fluid of claim 15, wherein the purification process further comprises separating the absorbent from the recovered oil, regenerating the absorbent to remove the impurities absorbed thereby, and recycling the regenerated absorbent back into the purification process.

17. The fluid of claim 1, wherein the purification process comprises contacting the recovered oil with an amount of activated carbon.

18. The fluid of claim 1, wherein the electrical stability is at least 1200V.

19. The fluid of claim 1, wherein the reclaimed oil is obtained by a method comprising:
(a) peptizing an acid-reactive substrate at a temperature between about 70° C. and about 105° C. with an acidic reagent under shear to obtain a peptizate having increased surface area, wherein the substrate comprises liquid bound on a solid sorbent material, wherein the liquid comprises oil or a mixture of oil and water, wherein the bound liquid comprises less than about 35 wt % of the substrate;
(b) cocurrently mixing the peptizate with a combustion effluent gas under turbulent conditions in a thermal desorption zone to heat the peptizate and desorb at least a portion of the oil from the sorbent material, wherein an average residence time for solids in the desorption zone is from 10 seconds to 5 minutes and wherein a dilute phase in the thermal desorption zone at exit therefrom has a temperature of at least about 200° C.;
(c) separating the peptizate-combustion effluent gas mixture into the dilute phase and a dense phase, wherein the dilute phase comprises oil vapor and whereby the dense phase has an oil content less than or equal to about 3 wt %;
(d) contacting the dilute phase with a first heat exchanger at a temperature above 100° C. to produce a first recovered fraction comprising at least 50 wt % of the oil in the substrate;
(e) recovering at least a portion of the oil present in first recovered fraction; and
(f) purifying at least a portion of the recovered oil by a purification process comprising contacting at least a portion of the recovered oil with a treatment solution, with an absorbent, with one or more reagents, separating, filtering, or a combination thereof, to produce the reclaimed oil.

20. The fluid of claim 1, further comprising less than about 0.4 wt % olefinic protons having a $^1$H NMR chemical shift of about 4.5-6 ppm relative to trimethylsilane in $CDCl_3$, based on the total number of protons present.

21. A water-in-oil emulsion comprising:
a surfactant system;
an aqueous phase;
from about 50 wt % to about 95 wt % of a reclaimed oil recovered by direct thermal desorption from a peptized substrate comprising a mixture of oil and water and a solid, acid-treated sorbent material; and
an electrical stability of greater than 1000V when determined according to API 13B-2;
the reclaimed oil comprising:
(a) greater than or equal to about 45 wt % long chain methylene $CH_2$ protons having a $^1$H NMR chemical shift greater than or equal to about 1.00 to 1.50 ppm relative to trimethylsilane in $CDCl_3$, based on the total number of protons present, and less than or equal to about 12 wt % $CH_2$/CH protons beta to an aromatic carbon having a $^1$H NMR chemical shift from greater than 1.50 to about 2.00 ppm relative to trimethylsilane in CDCl$_3$, based on the total number of protons present;
(b) an aniline point of greater than or equal to about 69° C. as determined by ASTM-D611;
(c) greater than or equal to about 5 ppm by weight of organically bound nitrogen, determined according to ASTM D4629;
(d) greater than or equal to about 100 ppm of total sulfur by weight, determined according to ASTM D5453;
(e) a flash point of greater than or equal to about 100° C., as determined using the Pensky-Martens closed cup analysis according to ASTM D93;
(f) a pour point of less than or equal to −15° C., as determined according to ASTM D-92;
(g) a specific gravity of from 0.82 to 0.86 as determined according to ASTM-D 1298 or ASTM-D287;
(h) greater than or equal to about 3.5 wt % aromatic protons having a $^1$H NMR chemical shift of greater than or equal to about 6.50 to about 8.50 ppm relative to trimethylsilane in CDCl$_3$, based on the total number of protons present; and
(i) less than 0.4 wt % olefinic protons having a $^1$H NMR chemical shift of 4.7-6 ppm relative to trimethylsilane in CDCl$_3$, based on the total number of protons present.

* * * * *